US012598487B2

(12) United States Patent　　　　(10) Patent No.: US 12,598,487 B2
Fu et al.　　　　　　　　　　　　　(45) Date of Patent:　　Apr. 7, 2026

(54) SLICING METHOD AND APPARATUS, STORAGE MEDIUM, AND PROCESSOR

(71) Applicant: InterDigital Patent Holdings, Inc., Wilmington, DE (US)

(72) Inventors: Zhe Fu, Guangdong (CN); Haorui Yang, Guangdong (CN)

(73) Assignee: InterDigital Patent Holdings, Inc., Wilmington, DE (US)

( * ) Notice: Subject to any disclaimer, the term of this patent is extended or adjusted under 35 U.S.C. 154(b) by 579 days.

(21) Appl. No.: 18/045,978

(22) Filed: Oct. 12, 2022

(65) Prior Publication Data

US 2023/0056120 A1　　Feb. 23, 2023

Related U.S. Application Data

(63) Continuation of application No. PCT/CN2020/084503, filed on Apr. 13, 2020.

(51) Int. Cl.
H04W 24/04　　(2009.01)
H04W 36/00　　(2009.01)
H04W 48/18　　(2009.01)

(52) U.S. Cl.
CPC ....... H04W 24/04 (2013.01); H04W 36/0079 (2018.08); H04W 48/18 (2013.01)

(58) Field of Classification Search
CPC .................................................. H04W 24/04
See application file for complete search history.

(56) References Cited

U.S. PATENT DOCUMENTS

| | | | | |
|---|---|---|---|---|
| 10,506,489 | B2 * | 12/2019 | Vrzic | H04W 36/26 |
| 10,932,253 | B2 * | 2/2021 | Centonza | H04W 72/27 |
| 11,463,947 | B2 * | 10/2022 | Jin | H04W 48/18 |
| 2018/0324663 | A1 | 11/2018 | Park et al. | |
| 2019/0158360 | A1 | 5/2019 | Xu et al. | |
| 2019/0306761 | A1 * | 10/2019 | Jin | H04W 76/30 |
| 2019/0357103 | A1 * | 11/2019 | Jin | H04W 36/0079 |
| 2019/0394683 | A1 | 12/2019 | Sillanpaa et al. | |
| 2020/0022033 | A1 * | 1/2020 | Wei | H04W 36/0064 |
| 2020/0022061 | A1 * | 1/2020 | Jin | H04W 48/06 |
| 2020/0169303 | A1 * | 5/2020 | Park | H04W 72/21 |
| 2020/0305054 | A1 * | 9/2020 | Zee | H04W 36/0061 |
| 2020/0344679 | A1 * | 10/2020 | Jin | H04L 69/322 |
| 2021/0274407 | A1 * | 9/2021 | Wu | H04W 36/304 |
| 2023/0014464 | A1 * | 1/2023 | Fu | H04W 36/12 |

(Continued)

FOREIGN PATENT DOCUMENTS

| | | |
|---|---|---|
| CN | 108632927 | 10/2018 |
| WO | 2017118489 | 7/2017 |

(Continued)

OTHER PUBLICATIONS

Nokia et al., "Connected mode mobility with slicing, " 3GPP TSG-RAN WG3#95bis, R3-171116, Apr. 2017.

(Continued)

*Primary Examiner* — Guang W Li

(74) *Attorney, Agent, or Firm* — Volpe Koenig

(57)　　　ABSTRACT

Disclosed are a slice processing method and apparatus, a storage medium, and a processor. The method includes: obtaining, by a first network side device, a first handover request sent from a source base station, and determining a handover behavior based on slice information.

20 Claims, 4 Drawing Sheets

Obtain, by a first network side device, a first handover request sent from a source base station — S102

Determine, by the first network side device, a handover behavior based on slice information — S104

(56) References Cited

U.S. PATENT DOCUMENTS

| | | | | |
|---|---|---|---|---|
| 2023/0054288 A1* | 2/2023 | Gao | .................. | H04W 36/0064 |
| 2023/0086410 A1* | 3/2023 | Sun | ....................... | H04W 48/18 |
| | | | | 370/254 |

FOREIGN PATENT DOCUMENTS

| | | | | |
|---|---|---|---|---|
| WO | WO-2018135992 A1 * | 7/2018 | ............ | H04W 48/18 |
| WO | 2018208371 | 11/2018 | | |

OTHER PUBLICATIONS

CATT, "Discussion on Slice-aware mobility," 3GPP TSG-RAN WG3 #95bis, R3-171012, Apr. 2017.
SA WG2, "Response LS on slice re-mapping during connected mode mobility," 3GPP TSG-SA WG2 Meeting #121, S2-174019, May 2017.
CMCC, "Email discussion for R17 proposals on slicing," 3GPP TSG RAN Meeting #85, RP-191778, Sep. 2019.
WIPO, International Search Report and Written Opinion for PCT/CN2020/084503, Dec. 30, 2020.
EPO, Extended European Search Report for EP Application No. 20930939.2, May 19, 2023.
ZTE, "NW Slice Availability Handling Approaches during Mobility," 3GPP TSG RAN WG3 Meeting #95bis, R3-171029, Apr. 2017.
Huawei, "Further Discussion on Slice Re-mapping," 3GPP TSG-RAN WG3 95bis, R3-171251, Apr. 2017.

* cited by examiner

Obtain, by a first network side device, a first handover
request sent from a source base station                    S102

Determine, by the first network side device, a
handover behavior based on slice information               S104 slice processing
apparatus 40 first obtaining unit
41

SLICING METHOD AND APPARATUS, STORAGE MEDIUM, AND PROCESSOR

CROSS-REFERENCE TO RELATED APPLICATION

This application is a continuation of International Application No. PCT/CN2020/084503, filed Apr. 13, 2020, the entire disclosure of which is incorporated herein by reference.

TECHNICAL FIELD

Embodiments of the present disclosure generally relate to the communication technical field, and more particularly, to a slice processing method and apparatus, a storage medium and a processor.

BACKGROUND

At present, in the procedure of handing over services through the slicing technology, once a target base station does not support a slice that a source base station wants to switch, the target base station cannot allocate radio resources for a Packet Data Unit (PDU) session corresponding to the slice, and a core network is triggered to release the PDU session, resulting in service discontinuity. The technical problem is that it is difficult for the slice processing to ensure service continuity. No effective solution has been proposed for this technical problem that the slice processing has difficulties in ensuring service continuity.

SUMMARY

At least part of embodiments of the present disclosure provide a slice processing method and apparatus, a storage medium and a processor, to at least solve the technical problem that it is difficult for slice processing to ensure service continuity.

According to an embodiment of the present disclosure, there is provided a slice processing method. The method may include: obtaining, by a first network side device, a first handover request sent from a source base station, and determining a handover behavior based on slice information.

According to an embodiment of the present disclosure, there is provided a slice processing apparatus. The apparatus is provided in a first network side device. The apparatus includes: a first obtaining unit configured to obtain a first handover request sent from a source base station, and determining a handover behavior based on slice information.

According to an embodiment of the present disclosure, there is provided a storage medium having a computer program stored thereon. The computer program is configured to, when being executed, perform any one of the above slice processing methods.

According to an embodiment of the present disclosure, there is provided a processor for running a program, wherein the program is configured to, when being executed, to perform any one of the above slice processing methods.

According to an embodiment of the present disclosure, there is provided an electronic device including a memory and a processor, wherein a computer program is stored in the memory, and the processor is configured to run the computer program to perform any one of the above slice processing methods.

According to an embodiment of the present disclosure, there is provided a chip, including: a processor configured to call and run a computer program from a memory to cause a device in which the chip is installed to perform any one of the above slice processing methods.

According to an embodiment of the present disclosure, there is provided a computer program product including computer program instructions that cause a computer to perform any one of the above slice processing methods.

According to an embodiment of the present disclosure, there is provided a computer program, which causes a computer to perform any one of the above slice processing methods.

In at least a part of embodiments of the present disclosure, the first network side device obtains the first handover request sent by the source base station, and determines the handover behavior based on the slice information. That is to say, during the handover procedure, the first network side device determines the specific handover behavior based on the handover information, and the specific handover process can ensure effective implementation of slice remapping, thereby ensuring the service continuity during handover, and avoiding the problem of service discontinuity in the handover procedure of the slice service. Thus, the technical problem that it is difficult for the slice processing to ensure service continuity can be solved, and accordingly the slice processing can ensure service continuity.

BRIEF DESCRIPTION OF THE DRAWINGS

The accompanying drawings described herein, which constitute a part of the present disclosure, are used to provide a further understanding of the present disclosure. Example embodiments of the present disclosure and their descriptions are used to explain the present disclosure and do not constitute an improper limitation of the present disclosure.

DETAILED DESCRIPTION

Figure 1:
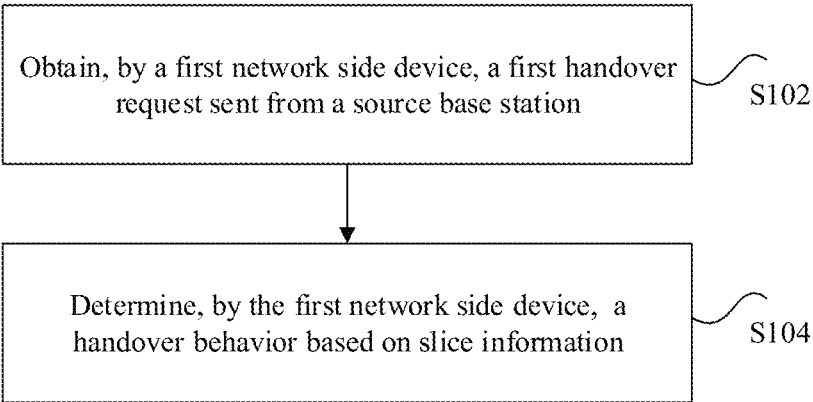
FIG. 1 is a flowchart of a slice processing method according to an embodiment of the present disclosure.

In order to make those skilled in the art better understand solutions of the present disclosure, the technical solutions in embodiments of the present disclosure will be clearly and completely described below with reference to the accompanying drawings in the embodiments of the present disclosure. The described embodiments are only some but not all of the embodiments of the present disclosure. Based on the embodiments of the present disclosure, all other embodiments obtained by those of ordinary skill in the art without creative efforts shall fall within the protection scope of the present disclosure. It should be noted that the terms "first", "second" and the like in the description and claims of the present disclosure and the drawings are used to distinguish similar objects, and are not necessarily used to describe a specific sequence or order. It is to be understood that the data so used may be interchanged under appropriate circumstances such that the embodiments of the present disclosure described herein can be practiced in sequences other than those illustrated or described herein. The terms "comprising" and "having", and any variations thereof, are intended to cover non-exclusive inclusion, for example, a process, method, system, product or device including a series of steps or units is not necessarily limited to those steps or units explicitly listed, but may include other steps or units not explicitly listed or inherent to these processes, methods, products or devices.

Embodiments of the present disclosure can be applied to various communication systems, such as: a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, a LTE Frequency Division Duplex (FDD) system, a LTE Time Division Duplex (TDD), a Universal Mobile Telecommunication System (UMTS), a Worldwide Interoperability for Microwave Access (WiMAX) communication system or a 5G system, and so on. A communication system applied in embodiments of the present disclosure may include a network device, and the network device may be a device that communicates with a terminal device (or called a communication terminal or a terminal). The network device can provide communication coverage for a specific geographic area, and can communicate with terminal devices in the coverage area. According to embodiments, the network device may be a base station (Base Transceiver Station, BTS) in a GSM system or a CDMA system, a base station (NodeB, NB) in a WCDMA system, an evolved base station (Evolutional Node B, eNB or eNodeB) in an LTE system, or a wireless controller in a Cloud Radio Access Network (CRAN), or the network device may be a mobile switching center, a relay station, an access point, an on-vehicle device, a wearable device, a hub, a switch, a network bridge, a router, a network device in a 5G network, or a network device in a future evolved Public Land Mobile Network (PLMN), etc.

The communication system further includes at least one terminal device within the coverage area of the network device. The "terminal device" as used herein may be connected in the following manners (including but not limited to): the terminal device may be connected via wired lines, such as via Public Switched Telephone Networks (PSTN), Digital Subscriber Line (DSL), digital cables, and direct cable connections; and/or the terminal may be connected via another data connection/network; and/or the terminal device may be connected via a wireless interface, such as cellular networks, wireless local area network (WLAN), digital TV networks such as DVB-H networks, satellite networks, AM-FM broadcast transmitter; and/or the terminal device is connected via a device of another terminal device which is configured to receive/send communication signals; and/or the terminal device is connected via an Internet of Things (IoT) device. A terminal device set as communicating through a wireless interface may be referred to as a "wireless communication terminal", a "wireless terminal" or a "mobile terminal". Examples of the mobile terminal include but are not limited to: satellite or cellular phone; Personal Communications System (PCS) terminal that can integrate a cellular radio phone with data processing, fax, and data communication capabilities; a PDA which can include a radio phone, a pager, an Internet/intranet access, a Web browser, a memo pad, a calendar, and/or Global Positioning System (GPS) receiver; and conventional laptop and/or palmtop receivers or other electronic device including a radio telephone transceiver. The terminal device can refer to access terminal, User Equipment (UE), user unit, user station, mobile station, mobile device, remote station, remote terminal, mobile equipment, user terminal, terminal, wireless communication equipment, user agent or user device. The access terminal can be a cellular phone, a cordless phone, a Session Initiation Protocol (SIP) phone, a Wireless Local Loop (WLL) station, a Personal Digital Assistant (PDA), a handheld device with wireless communication functions, a computing device or other processing device connected to a wireless modem, an in-vehicle device, a wearable device, a terminal device in 5G networks, or a terminal device in the future evolved PLMN, etc. According to some embodiments, a Device to Device (D2D) communication may be performed between the terminal devices. According to some embodiments, the 5G system or 5G network may also be referred to as a New Radio (NR) system or NR network. According to some embodiments, the communication system may further include other network entities such as a network controller or a mobility management entity, and embodiments of the present disclosure do not impose specific limitations on this. A device with a communication function in the network/system may be referred to as a communication device. The communication device may include a network device and a terminal device having a communication function. The network device and the terminal device may be the specific devices described above, and repeated descriptions will be omitted here. The communication device may also include other devices in the communication system, such as a network controller, a mobility management entity, or other network entities, and embodiments of the present disclosure do not impose specific limitations on this. The terms "system" and "network" are often used interchangeably herein. The term "and/or" herein is only an association relationship describing associated objects, which means that there can be three kinds of relationships, for example, A and/or B can mean: A alone, B alone, and A and B together. The character "/" generally indicates that the associated objects before and after "/" are in an "or" relationship.

According to one of the embodiments of the present disclosure, there is provided a slice processing method. The steps shown in the flowchart of the accompanying drawings may be performed in a computer system having such as a set of computer-executable instructions. Although the flowchart shows a logical order, in some cases the steps shown or described may be performed in an order different from that the order described herein. FIG. 1 is a flowchart of a slice processing method according to an embodiment of the present disclosure. As shown in FIG. 1, the method may include the following steps:

In step S102, a first network side device obtains a first handover request sent by a source base station. In this embodiment, the source base station (source gNB) sends the first handover request to the first network side device, and the first network side device receives the first handover request. Optionally, the first handover request in this embodiment may carry related information of a PDU session. The related information may include slice information, or QoS attribute set (QoS profile) information (for example, 5QI, corresponding QoS parameters) for a Quality of Service (QoS) flow level. The slice information, that is, the information of a network slice, may be configured by Operation Administration and Maintenance (OAM), and stored by the first network side device.

In step S104, the first network side device determines a handover behavior based on the slice information. After the first network side device obtains the first handover request sent by the source base station, the first network side device may determine the handover behavior based on the slice information. The first network side device may determine the handover behavior based on a certain rule. The handover behavior may include at least one of: whether handover is supported, whether a slice is supported, whether to perform slice remapping, whether to perform slice fallback, whether to feed a handover request acknowledgment (ACK) message back, and whether to feed a handover command message back.

During the handover procedure in this embodiment, the first network side device determines the specific handover behavior based on the handover information, and the specific handover process can ensure effective implementation of slice remapping, thereby ensuring the service continuity during handover, and avoiding the problem of service discontinuity in the handover procedure of the slice service. Thus, the technical problem that it is difficult for the slice processing to ensure service continuity can be solved, and accordingly the slice processing can ensure service continuity. The above method of according to embodiments will be further described below.

As an example implementation, the handover request ACK message or the handover command message is further used to indicate that the slice remapping or fallback is not supported, or to indicate that the slice remapping or fallback is supported. In an embodiment, when the handover behavior determined by the first network side device is to feed back the handover request ACK message or the handover command message, the handover request ACK message or the handover command message may further indicate that the slice remapping or fallback is not supported, or to indicate that the slice remapping or fallback is supported. As an example implementation, determining by the first network side device the handover behavior based on the slice information includes: if a first slice supported by a target base station is different from a second slice which the source base station requests to switch, determining, by the first network side device, one of the following behaviors: whether handover is supported, whether the slice is supported, whether to perform slice remapping, and whether to perform slice fallback. In this embodiment, the target base station (target gNB) supports the first slice, and the source base station requests to switch the second slice. In the case where the first network side device determines that the above-mentioned first slice and the second slice are different, determining by the first network side device the handover behavior may include whether handover is supported, or whether the slice is supported, or whether to perform slice remapping, or whether to perform slice fallback. As an example implementation, the first slice supported by the target base station being different from the second slice which the source base station requests to switch includes: a first slice identifier of the first slice being different from a second slice identifier of the second slice. In this embodiment, the first slice is identified by the first slice identifier, the second slice is identified by the second slice identifier. The first network side device may determine that the first slice is different from the second slice by determining the first slice identifier is different from the second slice identifier.

As an example implementation, if the first slice supported by the target base station is different from the second slice that the source base station requests to switch, determining by the first network side device whether the slice is supported may include the following. If the first slice is different from the second slice, the first network side device determines that handover is supported, or the slice is supported, or the slice remapping is supported, or the slice fallback is supported, when the first network side device determines that at least one of the following slice information satisfies a condition: a service corresponding to the first slice identifier, a service corresponding to the second slice identifier, a service corresponding to the first slice, a service corresponding to the second slice, a capability of the target base station for slice support, whether the target base station supports a default slice, a slice corresponding to the first slice identifier, a slice corresponding to the second slice identifier, a maximum number of supported slices, a maximum number of supported remapped slices, and a maximum number of supported fallback slices. In this embodiment, the handover behavior may include at least one of: handover is supported, determining that the slice is supported, supporting slice remapping, and supporting slice fallback. The slice information carried in the first handover request may include information related to the first slice and the second slice. For example, the slice information includes a service corresponding to the first slice identifier of the first slice, a service corresponding to the second slice identifier of the second slice, a service corresponding to the first slice, and a service corresponding to the second slice. The slice information may further include information related to the target base station, for example, including information used to indicate a capability of the target base station for slice support, information regarding whether the target base station supports a default slice, and may further include a slice corresponding to the first slice identifier and a slice corresponding to the second slice identifier. The above-mentioned services can be services with different requirements, including but not limited to services of application providers, and the services may further include a handover (HO) service. The slice information may further include supported numbers, for example, including the maximum number of supported slices, the maximum number of supported remapped slices, and the maximum number of supported fallback slices. The maximum number of supported remapped slices is the maximum number of slices that are supported to be remapped, and the maximum number of supported fallback slices is the maximum number of slices that are supported to be fallbacked. When the first network side device determines that the first slice is different from the second slice, the first network device can further determine whether the above-mentioned slice information satisfies a certain condition, so as to determine that the handover behavior is to support handover, or to support the slice, or to support slice remapping, or to support slice fallback.

As an example implementation, the first network side device determines that the slice information satisfies the condition in at least one of the following situations that:

the first network side device determines that the service corresponding to the first slice identifier is the same as the service corresponding to the second slice identifier;

the first network side device determines that the service corresponding to the first slice is the same as the service corresponding to the second slice;

the first network side device determines that a service group of the service corresponding to the first slice identifier is the same as a service group of the service corresponding to the second slice identifier;

the first network side device determines that a service group of the service corresponding to the first slice is the same as a service group of the service corresponding to the second slice;

the first network side device determines that the target base station supports the default slice;

the first network side device determines that the slice corresponding to the first slice identifier and the slice corresponding to the second slice identifier belong to a same slice group;

the first network side device supports the slice;

the first network side device supports the slice remapping;

the first network side device supports slice fallback; the number of slices that can be supported does not reach the maximum number of supported slices;

the number of remapped slices that can be supported does not reach the maximum number of supported remapped slices;

the number of fallback slices that can be supported does not reach the maximum number of supported fallback slices.

In this embodiment, when determining that the first slice is different from the second slice, the first network side device may further determine whether the service corresponding to the first slice identifier is the same as the service corresponding to the second slice identifier. If the service corresponding to one slice identifier is the same as the service corresponding to the second slice identifier, it can be determined that the slice information satisfies the above condition, and the first network side device may further determine the handover behavior, for example, the first network side device may determine the handover behavior is that the handover is supported (and meanwhile the slice remapping may be performed).

The first network side device of the embodiment may further determine whether the service corresponding to the first slice is the same as the service corresponding to the second slice. If it is determined that the service corresponding to the first slice is the same as the service corresponding to the second slice, it can be determined that the slice information satisfies the above condition, and the first network side device may determine the corresponding handover behavior.

The first network side device in this embodiment may further determine whether the service group of the service corresponding to the first slice identifier and the service group of the service corresponding to the second slice identifier are the same. If it is determined that the service group of the service corresponding to the first slice identifier is the same as the service group of the service corresponding to the second slice identifier, it can be determined that the slice information satisfies the above condition, and the first network side device may determine the corresponding handover behavior.

The first network side device in this embodiment may further determine whether the service group of the service corresponding to the first slice is the same as the service group of the service corresponding to the second slice. If it is determined that the service group of the service corresponding to the first slice is not the same with the service corresponding to the second slice, it can be determined that the slice information satisfies the above condition, and the first network side device may determine the corresponding handover behavior.

The first network side device in this embodiment may further determine whether the target base station supports the default slice. If it is determined that the target base station supports the default slice, it is determined that the above condition is satisfied, and the first network side device may determine the handover behavior. For example, the first network side device may determine the handover behavior is that handover is supported (meanwhile, slice remapping may be performed).

The first network side device in this embodiment may further determine whether the slice corresponding to the first slice identifier and the slice corresponding to the second slice identifier belong to a same slice group. If it is determined that the slice corresponding to the first slice identifier and the slice corresponding to the second slice identifier belong to a same slice group, it is determined that the above condition is satisfied, and the first network side device may determine the handover behavior. For example, the first network side device may determine the handover behavior is that handover is supported (meanwhile, slice remapping may be performed). Slice remapping is supported within a slice group. According to some embodiments, if the first network side device supports the slice, it is determined that the above condition is satisfied, and the handover behavior may be determined as that the slice is supported.

If the first network side device supports slice remapping, it may also be determined that the above condition is met, and the handover behavior may be determined as that slice remapping is supported.

If the number of slices that can be supported does not reach the maximum number of supported slices, it can be determined that the above condition is satisfied, and the corresponding handover behavior may be determined. For example, the handover behavior is that the slice is supported.

if the number of remapped slices that can be supported currently does not reach the maximum number of supported remapped slices, it can be determined that the above condition is satisfied, and the corresponding handover behavior may be determined. For example, the handover behavior may be determined as that slice remapping is performed.

If the number of fallback slices that can be supported currently does not reach the maximum number of supported fallback slices, it can be determined that the above condition is satisfied, and the corresponding handover behavior may be determined. For example, the handover behavior is that the slice fallback is performed.

As an example implementation, if the handover behavior is slice remapping or slice fallback, it may be considered that handover is supported. Accordingly, a positive handover response may be fed back. As an example implementation, the method further includes: if the first slice is the same as the second slice, determining, by the first network side device, one of the following behaviors: supporting the slice, determining to perform handover, the slice remapping, or the slice fallback. The first slice being the same as the second slice includes: the first slice identifier of the first slice being the same as the second slice identifier of the second slice. In this embodiment, when the first network side device determines that the first slice is the same as the second slice, it may determine that the handover behavior is that the slice is supported, or determining to perform handover, or perform slice remapping, or perform slice fallback. When it is determined that the first slice identifier is the same as the second slice identifier, it may be determined that the first slice and the second slice are the same.

As an example implementation, the method further includes: determining, by the first network side device, that handover is not supported, or the slice is not supported, or the slice remapping is not supported, or the slice fallback is not supported, in response to that the first slice is different from the second slice and/or the first network side device determines that at least one of the following slice information does not satisfy a condition:

the service corresponding to the first slice identifier, the service corresponding to the second slice identifier, the service corresponding to the first slice, the service corresponding to the second slice, the capability of the target base station for slice support, whether the target base station supports the default slice, the slice corresponding to the first slice identifier, the slice corresponding to the second slice identifier, the maximum number of supported slices, the maximum number of supported remapped slices, and the maximum number of supported fallback slices.

In this embodiment, the handover behavior may further include at least one of not supporting handover, not supporting the slice, not supporting slice remapping, and not supporting slice fallback. In the case where the first network side device determines that the first slice is different from the second slice, first network side device may determine the handover behavior as determining that handover is not supported, or slicing is not supported, or slice remapping is not supported, or slice fallback is not supported. And/or, if the first network side device of this embodiment determines that at least one of the service corresponding to the first slice identifier, the service corresponding to the second slice identifier, the service corresponding to the first slice, the service corresponding to the second slice, the capability of the target base station for slice support, whether the target base station supports the default slice, the slice corresponding to the first slice identifier and the slice corresponding to the second slice identifier, the maximum number of the supported slices, the maximum number of the supported remapped slices, and the maximum number of supported fallbacked slices does not satisfy a certain condition, the first network side device may determine the handover behavior as determining that handover is not supported, or slicing is not supported, or slice remapping is not supported, or slice fallback is not supported.

As an example implementation, the first network side device determines that the slice information does not satisfy the condition in at least one of the following situations that:

the first network side device determines that the service corresponding to the first slice identifier is different from the service corresponding to the second slice identifier;

the first network side device determines that the target base station does not support the default slice;

the first network side device determines that the slice corresponding to the first slice identifier and the slice corresponding to the second slice identifier do not belong to a same slice group;

the first network side device determines that the service corresponding to the first slice is different from the service corresponding to the second slice;

the first network side device determines that a service group of the service corresponding to the first slice identifier is different from a service group of the service corresponding to the second slice identifier;

the first network side device determines that a service group of the service corresponding to the first slice is different from a service group of the service corresponding to the second slice;

the first network side device does not support the slice;

the first network side device does not supports the slice remapping;

the first network side device does not support the slice fallback;

the number of slices that can be supported has reached the maximum number of supported slices;

the number of remapped slices that can be supported has reached the maximum number of supported remapped slices; and the number of fallback slices that can be supported has reached the maximum number of supported fallback slices.

In the case where the first network side device determines that the service corresponding to the first slice identifier is different from the service corresponding to the second slice identifier, the first network side device may determine that the slice information does not satisfy the condition, and may determine the handover behavior. For example, the first network side device may determine that the handover behavior as not supporting handover or not support slice remapping.

If the first network side device determines that the target base station does not support default slices, the first network side device may determine that the slice information does not satisfy the condition, and the first network side device may determine the handover behavior. For example, the first network side device may determine the handover behavior as not supporting handover or not support slicing remapping.

If the first network side device determines that the slice corresponding to the first slice identifier and the slice corresponding to the second slice identifier do not belong to the same slice group, the first network side device may determine that the slice information does not satisfy the condition, and the first network side device may determine the handover behavior. For example, the first network side device may determine the handover behavior as not supporting handover or not supporting slice remapping.

If the first network side device determines that the service corresponding to the first slice is different from the service corresponding to the second slice, the first network side device may also determine that the slice information does not satisfy the condition, and the first network side device may determine the corresponding handover behavior.

If the first network side device determines that the service group of the service corresponding to the first slice identifier is different from the service group of the service corresponding to the second slice identifier, the first network side device may also determine that the slice information does not satisfy the condition, and may determine the corresponding handover behavior.

If the first network side device determines that the service group of the service corresponding to the first slice is different from the service group of the service corresponding to the second slice, the first network side device may also determine that the slice information does not satisfy the condition, and may determine the corresponding handover behavior.

If the network side device does not support the slice, it may be determined that the slice information does not satisfy the condition, and the handover behavior may be determined as not supporting the slice.

If the first network side device does not support slice remapping, it may be determined that the slice information does not satisfy the condition, and the handover behavior may be determined as not supporting slice remapping.

If the first network side device does not support slice fallback, it may also be determined that the slice information does not satisfy the condition, and the handover behavior may be determined as not supporting slice fallback.

If the number of slices that can be supported has reached the maximum number of supported slices, it may also be determined that the slice information does not satisfy the condition, and the corresponding handover behavior may be determined. For example, the handover behavior may be determined as not supporting the slice.

If the number of remapped slices that can be supported has reached the maximum number of supported remapped slices, it may be determined that the slice information does not satisfy the condition, and the corresponding handover behavior may be determined. For example, the handover behavior may be determined as not supporting slice remapping.

If the number of fallback slices that can be supported has reached the maximum number of supported fallback slices, it may be determined that the slice information does not satisfy the condition, and the corresponding handover behavior may be determined. For example, the handover behavior may be determined as not supporting slice fallback.

As an example implementation, if the handover behavior is that the slice remapping or slice fallback is not supported, it may be considered that handover is not supported. Further, a negative handover response may be fed back. As an example implementation, the method further includes: based on the slice information, feeding back by the first network side device a handover response message, in addition to processing and determining the handover behavior. The handover response carries information indicating that the slice remapping or fallback is not supported, or, information indicating that the slice remapping or fallback is supported. The handover response message includes at least one of the following: handover failure information, a handover command, and a handover request ACK for the first handover request. As an example implementation, when the first network side device determines that at least one of the slice, slice remapping, and slice fallback is not supported, the method further includes: sending by the first network side device at least one of the following information: a handover response message, and a slice support result. In this embodiment, when the first network side device determines that at least one of the slice, slice remapping, and slice fallback is not supported, the first network side device may send a handover response message and/or a slice support result. The handover response message may include at least one of the handover failure information, the handover command, and the handover request ACK for the first handover request. The handover support result may exist alone or be carried in the handover request ACK, or may be carried in the handover command.

As an example implementation, the method further includes at least one of the following:

determining, by the first network side device, to perform the slice remapping or slice fallback, wherein the handover response message includes at least one of: a slice remapping success or slice fallback success, a corresponding Packet Data Unit (PDU) session list, and an identifier/indication for the slice remapping or slice fallback;

when the first network side device determines that the slice is supported, determining, by the first network side device, to perform the slice remapping or slice fallback, wherein the handover response message includes at least one of: a slice remapping success or slice fallback success, a corresponding PDU session list, an identifier/indication for slice support, and an identifier/indication for the slice remapping or slice fallback;

determining, by the first network side device, not to perform the slice remapping or slice fallback, wherein the handover response message includes at least one of: a cause that the slice remapping fails or the slice fallback fails or the slice is not supported, a corresponding PDU session list, and an identifier/indication for non-supported slice remapping or slice fallback;

when the first network side device determines that the slice is not supported, determining, by the first network side device, not to perform the slice remapping or slice fallback, wherein the handover response message includes at least one of: a cause that the slice remapping fails or the slice fallback fails or the slice is not supported, a corresponding PDU session list, and an identifier/indication for non-supported slice remapping or slice fallback;

wherein the handover response message includes information about whether the slice remapping is supported, or information about whether the slice fallback is supported.

In this embodiment, when the first network side device determines that the handover behavior is to perform slice remapping or to perform slice fallback, the first network side device may feed back a message indicating that the slice remapping is successful or a message indicating that the slice fallback is successful, and the first network side device may also feed back corresponding PDU session list, and the first network side device may also feed back an identifier/indication for slice remapping or slice fallback.

When the first network side device determines that the handover behavior is that the slice is supported, the first network side device may determine to perform slice remapping or slice fallback, and the first network side device may feed back a message indicating that the slice remapping or slice fallback is successful, and the first network side device may also feed back the corresponding PDU session list, and the first network side device may also feed back an identifier/indication indicating that the slice is supported, and the first network side device may also feed back an identifier/indication for slice remapping or slice fallback.

When the first network side device determines that the handover behavior is not to perform slice remapping or slice fallback, the first network side device may feed back a cause that the slice remapping fails, or a cause that the slice fallback fails, or a cause that the slice is not supported, and the first network side device may also feed back the corresponding PDU session list.

When the first network side device determines that the handover behavior is that the slice is not supported, the first network side device may determine not to perform slice remapping or slice fallback, and may feed back a cause that the slice remapping fails, or may feed back a cause that the slice fallback fails, or may feed back a cause that the slice is not supported, and the first network side device may also feed back the corresponding PDU session list, and the first network side device may also feed back the identifier/indication indicating that slice remapping or slice fallback is not supported. Optionally, in this embodiment, the handover response message may include information about whether the slice remapping is supported, or information about whether the slice fallback is supported, the handover response message may be a handover request ACK or a handover command. It should be noted that the above-mentioned PDU session list in the embodiments may be a PDU session list for a list, or may be a single PDU session (or, another understanding may be that there is only one PDU session in the list).

As an example implementation, when the first network side device determines that the slice is supported and determines to perform the slice remapping or slice fallback, the method further includes: sending, by the first network side device, a notification message for notifying that the slice remapping or slice fallback is performed to a second network side device.

In this embodiment, when the first network side device determines that the handover behavior is that the slice is supported, and slice remapping or slice fallback needs to be performed, the first network side device may continue the existing handover procedure and notifies the second network side device to perform slice remapping, or to perform slice fallback. The second network side device may be a Session management Function (SMF).

As an example implementation, sending, by the first network side device, the handover response message includes: sending, by the first network side device, handover failure information to the source base station.

In this embodiment, when the first network side device determines that the slice is not supported, or slice remapping is not supported, or slice fallback is not supported, the first network side device may send the handover failure information to the source base station. For example, the first network side device may send a cause that the slice remapping fails, or a cause that the slice fallback fails, or a cause that the slice is not supported.

As an example implementation, when the first network side device determines that the slice is not supported, the method further includes: sending, by the first network side device, a notification message for notifying that the slice is not supported to the target base station, wherein upon receiving of the notification message for notifying that the slice is not supported, the target base station generates information that the slice is not supported, and the first network side device sends the information that the slice is not supported to the source base station.

In this embodiment, if the first network side device determines that the slice is not supported, the first network side device may continue the existing handover procedure, but notify the target base station (T-TAN) of a notification message that the slice is not supported. The target base station needs to generate information that the slice is not supported, and finally notify the source base station of the information that the slice is not supported through the first network side device. If following the current handover procedure, the handover request ACK is finally considered, and indication information indicating that the slice is not supported is carried in this message (such as the slice is not supported, remapping is not supported, or fallback is not supported, etc.), and the indication information may be used by the source base station to determine whether to finally select the target base station for handover.

As an example implementation, the method further includes: if the first slice is different from the second slice, determining, by the first network side device, to perform the slice remapping or slice fallback when the first network side device determines that at least one of the following slice information satisfies a condition:

a Packet Data Unit (PDU) session that needs to be switched, and a slice that needs to be switched.

The first slice being different from the second slice includes: a first slice identifier of the first slice being different from a second slice identifier of the second slice.

In this embodiment, when the first network side device determines that the first slice is different from the second slice, for example, the first slice identifier is different from the second slice identifier, it may be determined that the handover behavior may include determining to perform slice remapping or slice fallback. If at least one of a PDU session that needs to be h switched and a slice that needs to be switched satisfies the condition, it can be determined that the handover behavior is to perform slice remapping or to perform slice fallback.

It should be noted that the above method for determining slice remapping or slice fallback may be used alone or in combination with the following method. The first network side device determines that the slice is supported, or determine to support handover, or determine to support slice remapping, or determine to support slice fallback when the first network side device determines that the first slice identifier is different from the second slice identifier, and determines that at lest one of the following slice information satisfies a condition: the service corresponding to the first slice identifier, the service corresponding to the second slice identifier, the service corresponding to the first slice, the service corresponding to the second slice, the capability of the target base station for slice support, whether the target base station supports the default slice, the slice corresponding to the first slice identifier and the slice corresponding to the second slice identifier.

As an example implementation, the first network side device determines that the slice information satisfies the condition and determines to perform handover or the slice remapping or the slice fallback in at least one of the following situations that:

the first network side device determines that the PDU session that needs to be switched has a requirement or indication for handover service continuity;

the first network side device determines that the slice to be switched has a requirement or indication for handover service continuity; the first network side device determines that the PDU session that needs to be switched but is not supported by the target base station is a service that needs to be guaranteed as priority;

the first network side device determines that the slice that needs to be switched but is not supported by the target base station is a service that needs to be guaranteed as priority; the number of slices that the first network side device can support has reached a corresponding threshold, and the slice that needs to be switched corresponds to a service that needs to be guaranteed as priority;

the number of slices that can be supported by the first network side device has reached a corresponding threshold, and the PDU session that needs to be switched has a requirement or indication for handover service continuity;

the number of remapped slices that can be supported by the first network side device has reached a corresponding threshold, and the slice that needs to be switched corresponds to a service that needs to be guaranteed as priority;

the number of remapped slices that can be supported by the first network side device has reached a corresponding threshold, and the PDU session that needs to be switched has a requirement or indication for handover service continuity;

the number of fallback slices that can be supported by the first network side device has reached a corresponding threshold, and the slice that needs to be switched corresponds to a service that needs to be guaranteed as priority; and the number of fallback slices that can be supported by the first network side device has reached a corresponding threshold, and the PDU session that needs to be switched has a requirement or indication for handover service continuity.

In the embodiment, the first network side device determines that the first slice is different from the second slice, and if it is further determined that the slice information satisfies a certain condition, the first network side device may determine that the handover behavior is to perform slice remapping or slice fallback.

In an embodiment, if first network side device determines that the PDU session that needs to be switched has a requirement or indication for handover service continuity, for example, has a requirement or indication for HO service continuity, the first network side device may determine that the slice information satisfies the condition, and may determine the corresponding handover behavior. For example, the handover behavior may be to perform slice remapping.

If the first network side device determines that the PDU session or slice that needs to be switched but is not supported by the target base station is a service that needs to be guaranteed as priority, the first network side device may also determine that the slice information satisfies the condition, and may determine the corresponding handover behavior. For example, the handover behavior may be to perform slice remapping or slice fallback.

Optionally, if the number of slices that can be supported by the first network side device has reached a corresponding threshold, and the slice that needs to be switched corresponds to a service that needs to be guaranteed as priority, the first network side device may determine that the slice information satisfies the condition, and may determine the corresponding handover behavior. The threshold is the number threshold.

If the number of slices that can be supported by the first network side device has reached a corresponding threshold, and the PDU session that needs to be switched has a requirement or indication for handover service continuity, the first network side device may determine that the slice information satisfies the condition, and may determine the corresponding handover behavior.

If the number of remapped slices that can be supported by the first network side device has reached a corresponding threshold, and the slice that needs to be switched corresponds to a service that needs to be guaranteed as priority, the first network side device may determine that the slice information satisfies the condition, and may determine the corresponding handover behavior.

If the number of remapped slices that can be supported by the first network side device has reached a corresponding threshold, and the PDU session that needs to be h switched has a requirement or indication for handover service continuity, the first network side device may determine that the slice information satisfies the condition, and may determine the corresponding handover behavior.

If the number of fallback slices that can be supported by the first network side device has reached a corresponding threshold, and the slice that needs to be switched corresponds to a service that needs to be guaranteed as priority, the first network side device may determine that the slice information satisfies the condition, and may determine the corresponding handover behavior.

If the number of fallback slices that can be supported by the first network side device has reached a corresponding threshold, and the PDU session that needs to be switched has a requirement or indication for handover service continuity, the first network side device may determine that the slice information satisfies the condition, and may determine the corresponding handover behavior.

It should be noted that, in the embodiments, when it is determined that the above-mentioned slice information satisfies the condition, handover may be performed, or slice remapping may be performed, or slice fallback may be performed.

As an example implementation, when the first network side device determines to perform slice remapping, the method further includes: sending, by the first network side device, a handover success message. The handover success message includes: slice remapping indication information, or a corresponding PDU session list. The slice remapping indication information is used to indicate to perform slice remapping, and a corresponding PDU session list may be included.

As an example implementation, when the first network side device determines to perform slice fallback, the method further includes: sending, by the first network side device, a handover success message. The handover success message includes: slice fallback indication information, or a corresponding PDU session list. The slice fallback indication information is used to indicate to perform slice fallback.

As an example implementation, the method further includes: if the first slice is the same as the second slice, performing, by the first network side device, the handover or the slice remapping or the slice fallback. The first slice being the same as the second slice, includes: a first slice identifier of the first slice being the same as a second slice identifier of the second slice.

In this embodiment, in the case that the first network side device determines that the first slice and the second slice are the same, for example, in a case that the first slice identifier and the second slice identifier are the same, the first network side device may further perform handover, or perform slice remapping, or perform slice fallback.

As an example implementation, the method further includes: determining, by the first network side device, that the slice remapping or the slice fallback is not supported if the first slice is different from the second slice, and/or, the first network side device determines that at least one of the following slice information does not satisfy a condition: a PDU session that needs to be switched, and a slice that needs to be switched. The handover behavior in this embodiment may include not to support the slice and not to support the slice remapping. In this embodiment, when the first network side device determines that the first slice and the second slice are different, the handover behavior may be determined as not supporting slice remapping or not supporting slice fallback. And/or, if the first network side device determines that the PDU session that needs to be switched or the slice that needs to be switched does not satisfy the condition, the first network side device may determine the handover behavior as not supporting slice remapping or not supporting slice fallback.

It should be noted that, in the above method embodiments, the first slice and the second slice being different may include the first slice identifier and the second slice identifier being different, and the first slice and the second slice being the same may include the first slice identifier and the second slice identifier being the same.

As an example implementation, wherein the first network side device determines that the slice information does not satisfy the condition in at least one of the following situations that:

the first network side device determines that the PDU session that needs to be switched does not have a requirement or indication for handover service continuity;

the first network side device determines that the slice that needs to be switched does not have the requirement or indication for handover service continuity;

the first network side device determines that the PDU session that needs to be switched but is not supported by the target base station is not a service that needs to be guaranteed as priority;

the first network side device determines that the slice that needs to be switched but is not supported by the target base station is not a slice that needs to be guaranteed as priority.

In an embodiment, if the first network side device determines that the PDU session or slice that needs to be switched does not have a requirement or indication for handover service continuity, the first network side device may determine that the slice information does not satisfy the condition, and may further determine the handover behavior as not supporting slice remapping or not supporting slice fallback.

If the first network side device determines that the PDU session or slice that needs to be switched but is not supported by the target base station is not a service that needs to be guaranteed as priority, the first network side device may determine that the slice information does not satisfy the condition, and then determine the handover behavior as not supporting slice remapping.

As an example implementation, when the first network side device determines that the handover or the slice remapping or slice fallback is not supported, the method further includes: sending, by the first network side device, at least one of: a handover response message, a list of PDU sessions that do not support slice remapping, a list of PDU sessions that do not support slice fallback, and a cause for nonsupport.

In an embodiment, when the first network side device determines the handover behavior as not supporting handover, or performing slice remapping, or performing slice fallback, the first network side device may feed back a handover response message. For example, the first network side device may feed back handover failure information, a handover command, or a handover request ACK, and the first network side device may also feed back a list of PDU sessions that do not support slice remapping, and the first network side device may also feed back a list of PDU sessions that do not support slice fallback, and a cause for nonsupport.

As an example implementation, the method further includes at least one of the following:

the handover response message including handover failure information, wherein the handover failure information includes a failure cause; wherein the failure cause includes at least one of: a slice remapping failure, a slice fallback failure, and slice non-supported;

the handover response message including a handover request ACK for the first handover request, wherein the handover request ACK includes information indicating that the slice remapping/slice fallback is not supported (for example, a nonsupport indication, or a cause for nonsupport and so on);

the handover response including a handover command, wherein the handover command includes information indicating that the slice remapping/slice fallback is not supported (for example, a nonsupport indication, or a cause for nonsupport and so on).

In an embodiment, the handover response message may include handover failure information, and the handover failure information may further include a failure cause, for example, including a cause that the slice remapping fails, a cause that the slice fallback fails, or a cause that the slice is not supported.

Optionally, in an embodiment, the handover response message may further include a handover request ACK, which may be used to indicate that the slice remapping/fallback is not supported.

As an example implementation, the above-mentioned slice information includes at least one of the following: information about capability of the target base station for slice support; a slice identifier supported by the source base station; a slice identifier corresponding a PDU session currently established by a terminal (User Equipment, UE); a slice identifier supported by the target base station; a service corresponding to the slice or slice identifier; a service group to which the service corresponding to the slice or slice identifier belongs; a group to which the slice or slice identifier belongs; an indication of whether the default slice of the target base station is supported or not; an indication of whether the target base station supports or allows a slice identified by a default slice identifier; whether a PDU session or slice that needs to be switched has a requirement or indication for handover service continuity; whether a PDU session or slice that needs to be switched but is not supported by the target base station is a service or slice that needs to be guaranteed as priority; a maximum number of supported slices; a maximum number of supported remapped slices; and a maximum number of supported fallback slices.

In an embodiment, the slice information is used to determine the handover behavior, and the slice information may include information about the slice support capability of the target base station. The slice support capability may include, but is not limited to, a capability of whether the target base station supports the slice, a capability of whether the target base station supports the slice remapping, or a capability of whether the target base station supports the slice fallback.

In an embodiment, the slice information may also be a slice identifier supported by the source base station.

In an embodiment, the slice information may also include a slice identifier corresponding to the PDU session currently established by the terminal.

In an embodiment, the slice information may also be a slice identifier supported by the target base station.

The slice information may also be a service corresponding to a slice identifier or a slice.

The slice information may also be a group to which the slice identifier or the slice belongs. Remapping may be performed among the slice identifiers of the same group.

In an embodiment, the slice information may also be an indication of whether the default slice of the target base station is supported.

The handover information may also be whether the PDU session or slice that needs to be switched has a requirement or indication for handover service continuity. The service continuity may be HO service continuity.

In an embodiment, the slice information may also be whether a PDU session or slice that needs to be switched but is not supported by the target base station is a service or slice that needs to be guaranteed as priority.

Optionally, in an embodiment, the slice information may also be the maximum number of supported slices. Whether the handover behavior is to support the slice may be determined by the maximum number of supported slices.

The slice information may also be the a maximum number of supported remapped slices. Whether the handover behavior is to support the slice remapping may be determined by the maximum number of supported remapped slices.

The slice information may also be the maximum number of supported fallback slices. Whether the handover behavior is to support the slice fallback may be determined by the maximum number of supported remapped slices.

It should be noted that the slice information may be a list or combination of information. It should be noted that the slice identifier in the above embodiments may include at least one: Single Network Slice Selection Assistance Information (S-NSSAI), Network Slice Selection Assistance Information (NSSAI) or a NSSAI list, and a network slice identifier (NSID).

It should be noted that a threshold corresponding to at least one of the maximum number of supported slices, the maximum number of supported remapped slices and the maximum number of supported fallback slices in the slice information in the embodiments is predefined, or is determined according to a network capability, or is configured based on other network entities, such as, Network Slice Management function (NSSF), Access and Mobility Management Function (AMF), or Operation Administration and Maintenance (OAM).

That is, in the embodiments, the thresholds (quantity thresholds) corresponding to the maximum number of supported slices, the maximum number of supported remapped slices, and the maximum number of supported fallback slices in the slice information may be predefined, or may be determined according to the network capability, or may be configured by other entities such as OAM.

As an example implementation, at least one of the maximum number of supported slices, the maximum number of supported remapped slices and the maximum number of supported fallback slices is a quantity supported by a network device as a whole (for example, AMF as a whole, UPF as a whole, SMF as a whole, or PLMN), or a quantity supported by each terminal perUE. That is, the maximum number of supported slices, the maximum number of supported remapped slices and the maximum number of supported fallback slices in the embodiments may be numbers for the network device as a whole, or may be numbers per UE.

As an example implementation, when at least one of the maximum number of supported slices, the maximum number of supported remapped slices and the maximum number of supported fallback slices is the quantity supported perUE or is the quantity supported by the network device as a whole:

in response to that a terminal has a first number of slices to be switched and a target base station supports handover of a second number of slices, the target base station determines that handover of the second number of slices among the first number of slices is supported, and determines to perform slice fallback or slice remapping on slices among the first number of slices other than the second number of slices, or the target base station determines that handover is not supported.

In this embodiment, when the maximum number of supported slices, the maximum number of supported remapped slices and the maximum number of supported fallback slices are the quantities per UE or are the quantities for the network device as a whole, if the terminal has a first number of slices to be switched and the target base station only supports handover of a second number of slices, a situation is that the target base station may determine to support handover of the second number of slices among the first number of slices, and for the remaining slices in the first number of slices, slice fallback or slice remapping may be performed. For example, the terminal has five slices to be switched, and the base station only supports three slices. In this case, the target base station may hand over three slices among the five slices. For the remaining two slices, slice fallback or slice remapping may be performed. Another situation is that it may be determined that the handover is not supported.

As an example implementation, in a case where the numbers are quantities supported by a network device as a whole (for example, AMF as a whole, UPF as a whole, SMF as a whole, or PLMN), or quantities supported by each terminal (perUE), when the target base station cannot accept all slices, the target base station does not support the handover.

As an example implementation, in a case where the numbers are quantities supported by a network device as a whole (for example, AMF as a whole, UPF as a whole, SMF as a whole, or PLMN), or quantities supported by each terminal (perUE), when the target base station cannot accept all the slices, according to priorities of the slices that need to be switched, the target base station determines slices to be preferentially accepted or fallback or remapped. That is, in a case where the above-mentioned maximum number of supported slices, the maximum number of supported remapped slices and the maximum number of supported fallback slices are for the network device as a whole, or, in a case where the above-mentioned maximum number of supported slices, the maximum number of supported remapped slices and the maximum number of supported fallback slices are number supported per UE, when the target base station cannot accept all the slices, the target base station determines which slices to be accepted/fallbacked/remapped preferentially according to the priorities of the slices that need to be switched.

As an example of the above method, if the target base station determines that the maximum number of supported slices does not reach the corresponding threshold, the slice of the terminal that needs to be switched can be accepted, and thus it may be determined that the handover is successful, or it may be determined to perform slice remapping or slice fallback. Optionally, if the maximum number of fallback slices supported by the target base station does not reach the corresponding threshold, the slice of the terminal that needs to be switched can be accepted, and thus it may be determined that the handover is successful, or it may be determined to perform slice fallback. Optionally, if the maximum number of remapping slices supported by the target base station does not reach the corresponding threshold, the slice of the terminal that needs to be switched can be accepted, and thus it may be determined that the handover is successful, or it may be determined to perform slice remapping.

As another optional example of the above method, if the maximum number of slices supported by the target base station has reached the corresponding threshold, the slice of the terminal that needs to be switched cannot be accepted, and thus it may be determined that the handover fails, or it may be determined to perform slice remapping or slice fallback. Optionally, if the maximum number of slices supported by the target base station has reached the corresponding threshold, even if the slice supported by the target base station and the slice which the source base station requests to switch are the same, the slice of the terminal to be switched cannot be accepted, and thus it may be determined that the handover fails, or it may be determined to perform slice remapping. Optionally, if the maximum number of fallback slices supported by the target base station has reached the corresponding threshold, the slice of the terminal that needs to be switched cannot be accepted, and thus it may be determined that the handover fails, or it may be determined to perform handover but to indicate that the slice is not accepted or the slice fallback fails. Optionally, if the maximum number of remapped slices supported by the target base station has reached the corresponding threshold, the slice of the terminal that needs to be switched cannot be accepted, and thus it may be determined that the handover fails, or it may be determined to perform handover but to indicate that the slice is not supported or the slice remapping fails.

As an example implementation, when the numbers are the quantities supported by the network device as a whole or the quantities supported per UE, if the maximum number of slices supported by the target base station reaches the corresponding threshold, even if the slice supported by the target base station is the same as the slice to be switched by the source base station, the slice of the UE to be switched cannot be accepted, and thus it may be determined that handover fails, or it may be determined to perform slice remapping or slice fallback.

As another optional implementation manner, when the numbers are the quantities supported by the network device as a whole or the quantities supported per UE, if the maximum number of remapped slices supported by the target base station reaches the corresponding threshold, even if the slice supported by the target base station and the slice to be switched by the source base station are the same, the slice of the UE to be switched cannot be accepted, and thus it may be determined that the handover fails, or it may be determined to perform slice fallback.

As an example implementation, the method further includes at least one of:

sending, by the first network side device, a first context update request to a second network side device, wherein:

the first context update request includes at least one of: a remapped or fallbacked packet data unit session with a cause value for remapping or fallback, an indication that remapping or fallback is needed, a PDU session that needs to be remapped or fallbacked, and a cause value for the remapping or fallback;

obtaining, by the first network side device, a first context update response, wherein the first context update response is a response by the second network side device to the first context update request, and is used to indicate a result of performing slice remapping or fallback on the PDU session;

sending, by the first network side device, a second handover request to a target base station, wherein:

the second handover request includes at least one of: the remapped or fallbacked packet data unit session with the cause value for remapping or fallback, and an indication that remapping or fallback is needed;

obtaining, by the first network side device, a handover request response message, wherein the handover request response message is from the target base station, and includes at least one of:

the remapped or fallbacked packet data unit session with the cause value for remapping or fallback, a list of failed PDU sessions, failure causes corresponding to the failed PDU sessions, and a data forwarding tunnel corresponding to a PDU session that needs to be remapped or fallbacked;

sending, by the first network side device, a second context update request to the second network side device after obtaining the handover request response message, wherein the handover request response message is obtained by the target base station in response to the second handover request and is used to update session management information based on a result of the target base station;

obtaining, by the first network side device, a second context update response, and confirming an update result of session management;

sending, by the first network side device, a handover command to the source base station, wherein:

the handover command includes at least one of: the remapped or fallbacked packet data unit session with the cause value for remapping or fallback and the data forwarding tunnel corresponding to the PDU session that needs to be remapped or fallbacked;

sending the handover command to a terminal via the source base station, wherein the handover command includes the remapped or fallbacked packet data unit session with the cause value for remapping or fallback.

In an embodiment, the first network side device sends a first context update request to the second network side device. The first context update request may be a first network slice management function packet data unit session context update request (Nsmf_PDUSession_UpdateSM-Context Request), which may include a remapped or fallbacked packet data unit session with a cause value for remapping or fallback (PDU session Remapped with a remapped Cause), an indication that remapping or fallback is needed (PDU Session Is To Be Remapped/Fallback), a PDU session that needs to be remapped or fallbacked, or a cause value for the remapping or fallback (remapped/fallback Cause).

In an embodiment, after obtaining the above-mentioned first context update request, the second network side device may respond to the first context update request to obtain a first context update response. The first context update response may be a first network slice management function packet data unit session context update response (Nsmf_PDUSession_UpdateSMContext Response), which may be used to indicate a result of performing slice remapping or fallback on the PDU session. The result may include at least one of: an indication for indicating a list of remapped packet data unit sessions (list of PDU session remap) that are successful, a list of successful PDU sessions, and a list of failed PDU sessions.

In an embodiment, the first network side device may further send a second handover request (handover request message) to the target base station (T-TAN). The second handover request may include at least one of the following: the remapped or fallbacked packet data unit session with the cause value for remapping or fallback, and an indication that remapping or fallback is needed.

In an embodiment, the target base station sends a handover request response message (Handover Request Acknowledge) to the first network side device, and the first network side device obtains the handover request response message, which may include at least one of the following: the remapped or fallbacked packet data unit session with the cause value for remapping or fallback, a list of failed PDU sessions, failure causes corresponding to the failed PDU sessions, and a data forwarding tunnel corresponding to a PDU session that needs to be remapped or fallbacked.

After obtaining the handover request response message, the first network side device may further send a second context update request to the second network side device. The second context update request may be a second Nsmf_PDUSession_UpdateSMContext Request. The handover request response message may be obtained by the target base station in response to the second handover request and may used to update session management (SM) information based on a result of the target base station.

The first network side device obtains a second context update response, which may be a second Nsmf_PDUSession_UpdateSMContext Response, which may be obtained by the second network side device in response to the second context update request, and may be used to confirm the update result of session management.

In an embodiment, the first network side device may further send a handover command to the source base station (S-RAN). The handover command includes at least one of: the remapped or fallbacked packet data unit session with the cause value for remapping or fallback and the data forwarding tunnel corresponding to the PDU session that needs to be remapped or fallbacked.

After the source base station receives the handover command, the source base station may send at least part of the handover command to the terminal. The handover command sent to the terminal may include the remapped or fallbacked packet data unit session with the cause value for remapping or fallback.

As an example implementation, a data packet of the PDU session is forwarded by the source base station to the target base station through the data forwarding tunnel. The source base station may obtain the data forwarding tunnel, and may forward the data packet of the PDU session to the target base station through the data forwarding tunnel. Specifically, for the data packet of the PDU session corresponding to the slice that need to be remapped or fallbacked, the source base station may forward the data packet to the target base station through the data forwarding tunnel to ensure the continuity of transmission.

It should be noted that the above-mentioned first network side device includes at least one of: an access and mobility management function (AMF), a session management function (SMF), a 5G base station (gNB), and a next-generation eNB (NG-eNB). The AMF may be a source AMF or a target AMF.

As an example implementation, the entities used for slice determination include at least two, and in addition to the above-mentioned first network side device, the entities used for slice determination may further include a second network side device. The second network side device may be used to determine whether to perform slice remapping, or determine whether to perform slice fallback, or modify the result of slice remapping determined by the first network side device, or modify the result of slice fallback determined by the first network side device. The first network side device obtains the result of slice remapping or slice fallback modified by the second network side device. In an embodiment, the second network side device may further determine whether to perform slice remapping, or whether to perform slice fallback, or even modify the result of slice remapping given by the first network side device, or modify the result of slice fallback, and notify the first network side device of the modified result of slice remapping or the modified result of slice fallback. The second network side device may similarly determine the result of slice remapping according to the current resource occupancy, processing capability, slice information (similar to the above slice information), slice mapping rules (the above-described rules for determining handover behavior based on slice information), and so on. When performing notification, the second network side device may further indicate the modified result of slice remapping and a cause value. For example, at least one of a list of successful PDU Session remap SMFs, a list of failed PDU Session remaps, and a list of modified PDU Session remaps may be given, and a corresponding cause value may also be given. Optionally, the second network side device may send a context update response (Nsmf_PDUSession_UpdateSMContext Response) to the first network side device to indicate the foregoing related information.

In an embodiment, when multiple first network side devices participate in the determination and processing of slice remapping, during the handover procedure, multiple first network side entities may cooperatively determine whether to perform handover, or determine the condition for whether to perform slice remapping. The specific process and details take into account the actual situations and processing capabilities of multiple first network side entities, which can ensure the effective implementation of slice remapping and avoid the problem of service discontinuity during the handover procedure of slice services.

As an example implementation, in the case where there are one or at least two slice determination entities, the method further includes at least one of the following:

triggering, by the second network side device, a Packet Data Unit (PDU) session modification/establishment procedure, and adding a remapped PDU session;

optionally, in response to that the second network side device triggers the PDU session establishment procedure, notifying, by the second network side device, an application server, wherein the application server notifies an application layer of the terminal, and the application layer of the terminal notifies a non-access stratum (UE NAS) of the terminal to establish a corresponding PDU session; and in response to that the second network side device triggers the PDU session modification procedure, updating, by the second network side device, a network slice identifier corresponding to the PDU session to at least one of the terminal, the first network side device and a base station.

Optionally, if the PDU session modification procedure is triggered, a corresponding relationship between the PDU session and the slice may be modified, and/or the slice identifier of the PDU session may be modified.

In an embodiment, for a PDU session that needs to be remapped, the second network side device may trigger the PDU session modification/establishment procedure and add the remapped PDU session.

If the PDU session establishment procedure is triggered, the second network side device may notify the application server, the application server notifies the application layer of the terminal, and the application layer of the terminal notifies the UE NAS to establish a corresponding PDU session.

Optionally, the second network side device triggers a PDU session modification procedure, and updates the network slice identifier corresponding to the PDU session to the terminal, the first network side device, and the base station.

For a PDU session that needs to be fallbacked, the second network side device may trigger the PDU session modification/establishment procedure and add the fallbacked PDU session.

If the PDU session establishment procedure is triggered, the second network side device notifies the application server, and the application server notifies the application layer of the terminal, and the application layer of the terminal notifies the UE NAS to establish a corresponding PDU session.

Optionally, the second network side device triggers a PDU session modification procedure, and updates the network slice identifier corresponding to the PDU session to at least one of the terminal, the first network side device, and the base station.

As an example implementation, if a target PDU session for remapping or fallback is a PDU session not currently established by a terminal, a new PDU session is required to be established to correspond to a user plane bearer DRB for an original PDU session; and/or if the PDU session for remapping or fallback is a PDU session currently established by the terminal, the original PDU session and/or DRB are deleted; and/or
    data of the DRB for the original PDU session which is to be remapped or fallbacked is forwarded to a path of the target PDU session for remapping or fallback so as to be transmitted to a User Plane Function (UPF).

In an embodiment, for a PDU session that needs to be remapped, if the PDU session as the remapping target is a PDU session that the terminal has not established currently, the second network side device may trigger the PDU session modification/establishment procedure to add the remapped PDU session.

Optionally, if the PDU session establishment procedure is triggered, the second network side device may notify the application server, and the application server notifies the application layer of the terminal, and the application layer of the terminal notifies the UE NAS to establish the corresponding PDU session.

Optionally, the second network side device triggers a PDU session modification procedure, and updates the network slice identifier corresponding to the PDU session to the terminal, the first network side device, and the base station.

Optionally, if the PDU session modification procedure is triggered, a corresponding relationship between the session and the slice may be modified, and/or the slice identifier of the session may be modified.

For a PDU session that needs to be fallbacked, if the PDU session as the fallback target is a PDU session that is not currently established by the terminal, the second network side device may trigger the PDU session modification/establishment procedure to add the fallbacked PDU session.

Optionally, if the PDU session establishment procedure is triggered, the second network side device may notify the application server, and the application server notifies the application layer of the terminal, and the application layer of the terminal notifies the UE NAS to establish the corresponding PDU session.

Optionally, the second network side device triggers a PDU session modification procedure, and updates the network slice identifier corresponding to the PDU session to the terminal, the first network side device, and the base station.

Optionally, if the PDU session modification procedure is triggered, the corresponding relationship between the session and the slice may be modified, and/or, the slice identifier of the session may be modified.

It should be noted that the above slice processing method in the embodiments may be applied to the scenario of Xn interface handover, and may also be applied to the scenario of N2 interface handover, and may also be applied to gNB↔gNB, NG-eNB↔gNB, NG-eNB↔NG-eNB, and may also be applied to the scenario in which only the source base station is allowed to trigger N2 handover during the handover procedure involving slices.

The above methods of the present disclosure will be illustrated below with reference to the example embodiments below.

Figure 2:
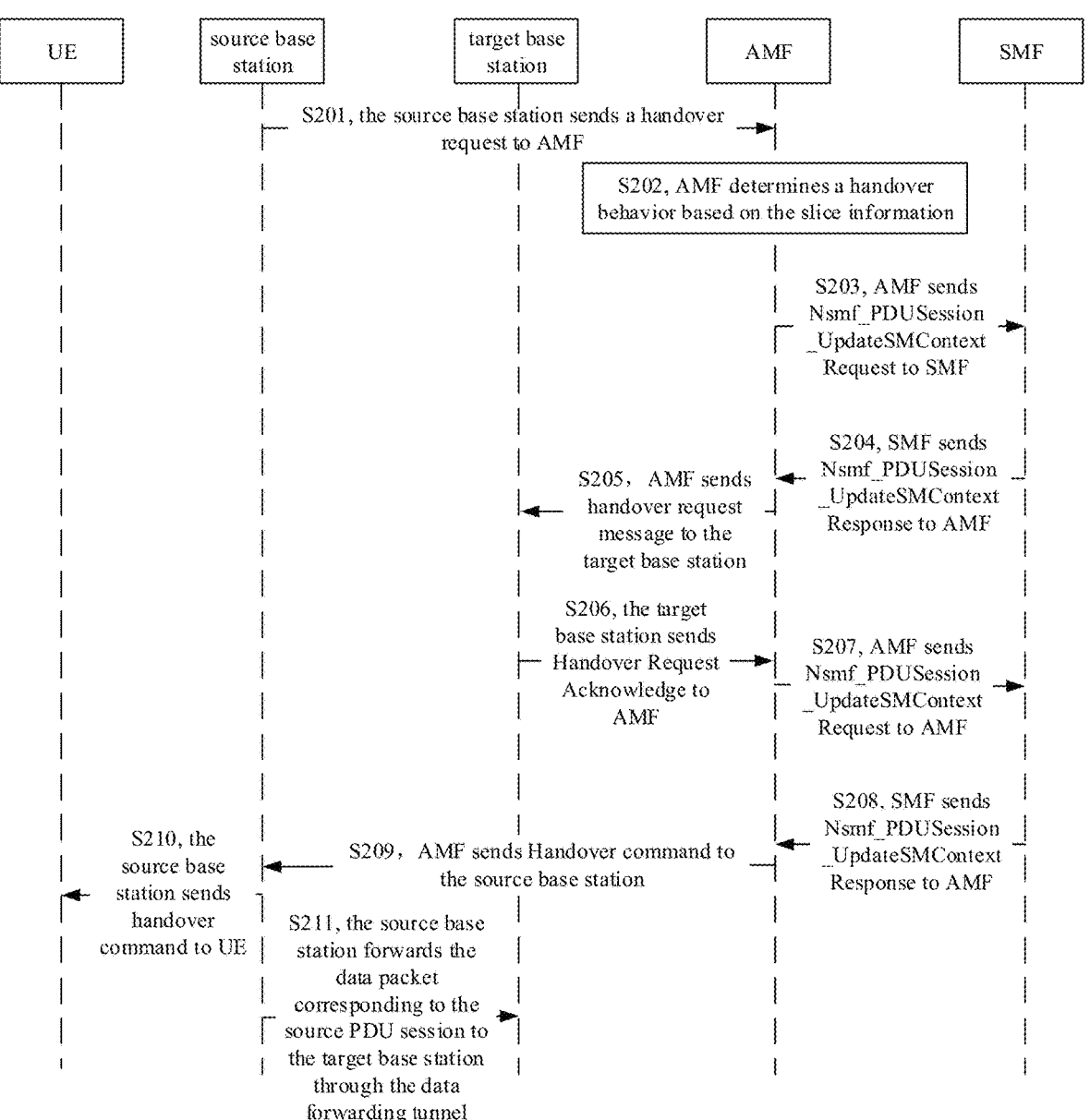
FIG. 2 is an interactive schematic diagram of a slice processing method according to an embodiment of the present disclosure.

FIG. 2 is an interactive schematic diagram of a slice processing method according to an embodiment of the present disclosure. As shown in FIG. 2, the method may include the following steps:

In step S201, a source base station sends a handover request to an AMF. The AMF may be a source AMF or a target AMF.

In step S202, the AMF determines the handover behavior according to the slice information.

In step S203, the AMF sends an Nsmf_PDUSession_UpdateSMContext Request to SMF. The Nsmf_PDUSession_UpdateSMContext Reques of this embodiment includes PDU session Remapped with a remapped Cause, PDU Session Is To Be Remapped indication (and remapped Cause).

Optionally, for a PDU session to be remapped, SMF triggers the PDU session modification/establishment procedure and adds the remapped PDU session (if the PDU session establishment procedure is triggered, the SMF notifies the application server, and the application server notifies the application layer of UE, and the application layer of UE notifies the UE NAS to establish the corresponding PDU session). The SMF triggers the PDU session modification procedure to update the network slice identifier corresponding to the PDU session to the UE, AMF, and the base station.

In step S204, the SMF sends an Nsmf_PDUSession_UpdateSMContext Response to the AMF. The Nsmf_PDUSession_UpdateSMContext Response of this embodiment indicates that a list of successful PDU Session remaps.

In step S205, the AMF sends a handover request message to the target base station. The handover request may include PDU session Remapped with a remapped Cause.

In step S206, the target base station sends a Handover Request Acknowledge to the AMF. The Handover Request Acknowledge in this embodiment may include PDU session Remapped with a remapped Cause. The target base station may also include a Data forwarding tunnel of the PDU session (original session) that needs to be remapped.

In step S207, the AMF sends an Nsmf_PDUSession_UpdateSMContext Request to the SMF. The Nsmf_PDUSession_UpdateSMContext Request is used to update the information of the SM based on the result of the target base station.

In step S208, the SMF sends the Nsmf_PDUSession_UpdateSMContext Response to the AMF.

In step S209, the AMF sends the handover command to the source base station. The handover command includes PDU session Remapped with a remapped Cause.

In step S210, the source base station sends a handover command to the UE.

In step S211, the source base station forwards the data packet corresponding to the source PDU session to the target base station through the data forwarding tunnel.

In the above method of this embodiment, during the handover procedure, it is possible to determine whether the handover is supported, whether the slice is supported, whether to perform slice remapping, whether to perform slice fallback, whether to feed back a handover request ACK message, or whether to feed back a handover command message. The specific procedure and details can ensure the effective implementation of slice remapping, thereby avoiding the problem of service discontinuity during the handover procedure of slice services.

Figures 3, 4:
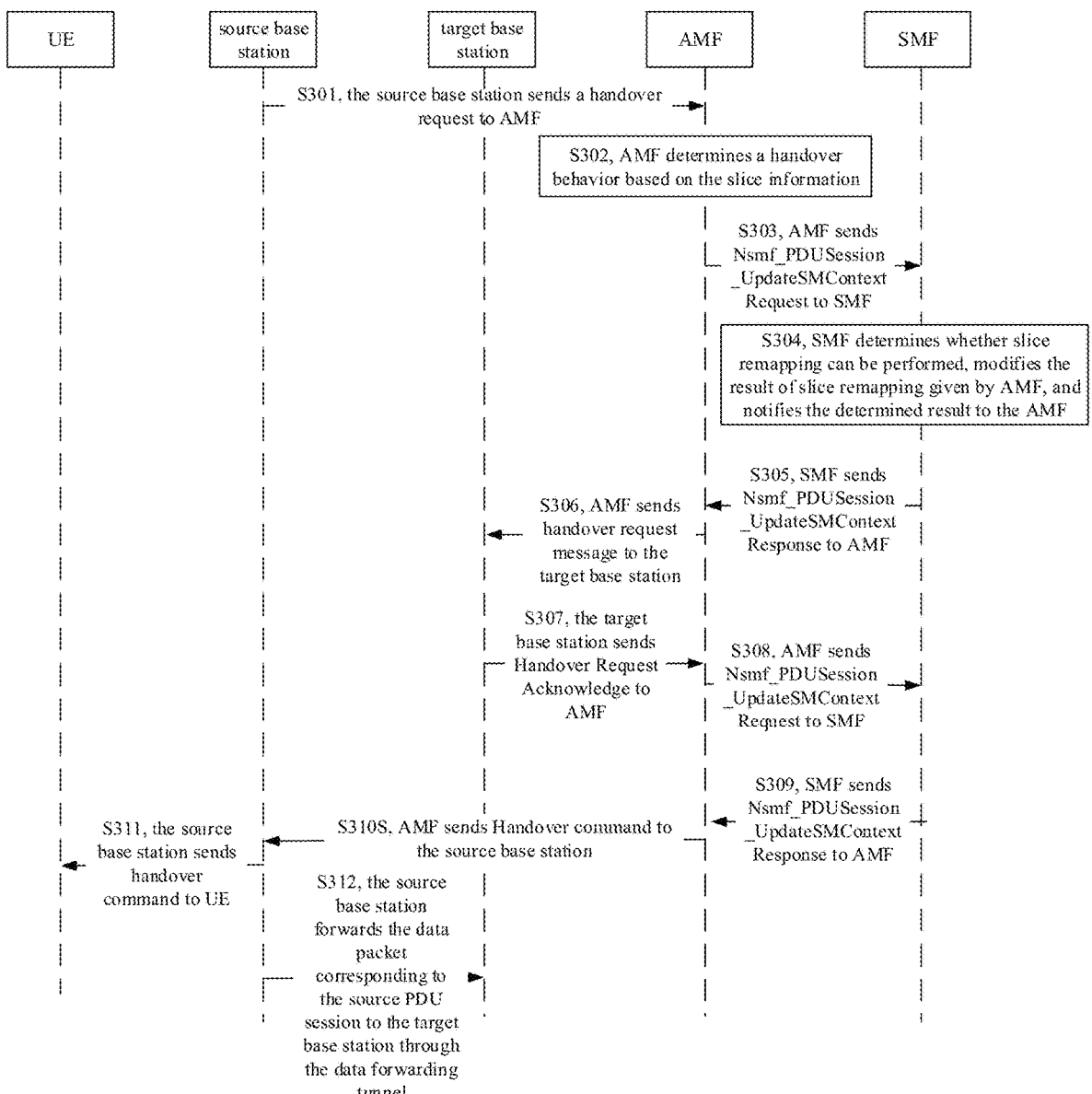
FIG. 3 is an interactive schematic diagram of another slice processing method according to an embodiment of the present disclosure.
FIG. 4 is a structural block diagram of a slice processing apparatus according to an embodiment of the present disclosure.

FIG. 3 is an interactive schematic diagram of another slice processing method according to one embodiment of the present disclosure. As shown in FIG. 3, the method may include the following steps:

In step S301, a source base station sends a handover request to the AMF. The AMF may be a source AMF or a target AMF.

In step S302, the AMF determines the handover behavior according to the slice information.

In step S303, the AMF sends an Nsmf_PDUSession_Up-dateSMContext Request to the SMF. The Nsmf_PDUSession_UpdateSMContext Reques of this embodiment includes PDU session Remapped with a remapped Cause, PDU Session Is To Be Remapped indication (and a remapped Cause).

Optionally, for a PDU session to be remapped, SMF triggers the PDU session modification/establishment procedure and add the remapped PDU session (if the PDU session establishment procedure is triggered, the SMF notifies the application server, and the application server notifies the application layer of the UE, and the application layer of the UE notifies the UE NAS to establish the corresponding PDU session). The SMF triggers the PDU session modification procedure to update the network slice identifier corresponding to the PDU session to the UE, AMF, and the base station.

In step S304, the SMF determines whether slice remapping can be performed, modifies the result of slice remapping given by the AMF, and notifies the AMF of the determination result. The SMF may similarly determine the result of slice remapping according to the current resource occupancy, processing capability, slice information (similar to the above slice information), slice mapping rules (the above-described rules for determining handover behavior based on slice information), and so on. When performing notification, the SMF may further indicate the modified result of slice remapping and a cause value.

In step S305, the SMF sends an Nsmf_PDUSession_Up-dateSMContext Response to the AMF. The Nsmf_PDUSession_UpdateSMContext Response may indicate the above-mentioned related information described in step S304.

In step S306, the AMF sends a handover request message to the target base station. The handover request may include PDU session Remapped with a remapped Cause. Optionally, the AMF may update the PDU session Remapped with a remapped Cause based on the feedback of the SMF in step S304.

In step S307, the target base station sends a Handover Request Acknowledge to the AMF. The Handover Request Acknowledge in this embodiment may include PDU session Remapped with a remapped Cause. The target base station may also include a data forwarding tunnel of the PDU session (original session) that needs to be remapped.

In step S308, the AMF sends an Nsmf_PDUSession_Up-dateSMContext Request to the SMF. The Nsmf_PDUSession_UpdateSMContext Request is used to update the information of the SM based on the result of the target base station.

In step S309, the SMF sends the Nsmf_PDUSession_Up-dateSMContext Response to the AMF.

In step S310, the AMF sends a handover command to the source base station. The handover command includes PDU session Remapped with a remapped Cause.

In step S311, the source base station sends a handover command to the UE.

In step S312, the source base station forwards the data packet corresponding to the source PDU session to the target base station through the data forwarding tunnel.

The method in this embodiment can be used to realize an example flow of multiple entities participating in the determination and processing of slice remapping. During the handover procedure, multiple entities cooperate to determine the conditions for whether to perform the handover or whether to remap the slice. The specific flow and details take the actual situations and processing capabilities of multiple entities into consideration, which can ensure the effective implementation of slice remapping, thereby avoiding the problem of service discontinuity during the handover procedure of slice services.

From the description of the above embodiments, those skilled in the art can clearly understand that the method according to the above embodiments can be implemented by means of software plus a necessary general hardware platform, or may be implemented by hardware, but in many cases the former is better implementation.

An embodiment of the present disclosure further provides a slice processing apparatus, configured to implementing the above embodiments and example embodiments. Repeated descriptions will be omitted here. FIG. 4 is a structural block diagram of a slice processing apparatus according to an embodiment of the present disclosure. As shown in FIG. 4, the slice processing apparatus 40 includes a first obtaining unit 41 configured to obtain a first handover request sent from a source base station, and determining a handover behavior based on slice information.

According to some embodiments, the handover behavior includes at least one of: whether handover is supported, whether a slice is supported, whether to perform slice remapping, whether to perform slice fallback, whether to feed a handover request acknowledgment (ACK) message back, and whether to feed a handover command message back.

The handover request ACK message or the handover command message is further used to indicate that the slice remapping or fallback is not supported, or to indicate that the slice remapping or fallback is supported.

According to some embodiments, the obtaining unit includes:

a determination module configured to, in response to that a first slice supported by a target base station is different from a second slice which the source base station requests to switch, determine one of the following behaviors: whether handover is supported, whether the slice is supported, whether to perform slice remapping, and whether to perform slice fallback.

According to some embodiments, the first slice supported by the target base station being different from the second slice which the source base station requests to switch includes:

a first slice identifier of the first slice being different from a second slice identifier of the second slice.

According to some embodiments, the determination module includes:

a first determination submodule configured to, in response to that the first slice is different from the second slice, determine that handover is supported, or the slice is supported, or the slice remapping is supported, or the slice fallback is supported, when the first determination submodule determines that at least one of the following slice information satisfies a condition:

a service corresponding to the first slice identifier, a service corresponding to the second slice identifier, a service corresponding to the first slice, a service corresponding to the second slice, a capability of the target base station for slice support, whether the target base station supports a default slice, a slice corresponding to the first slice identifier, a slice corresponding to the second slice identifier, a maximum number of supported slices, a maximum number of supported remapped slices, and a maximum number of supported fallback slices.

According to some embodiments, the first determination submodule is configured to determine that the slice information satisfies the condition in at least one of the following situations that:

the service corresponding to the first slice identifier is the same as the service corresponding to the second slice identifier;

the service corresponding to the first slice is the same as the service corresponding to the second slice;

a service group of the service corresponding to the first slice identifier is the same as a service group of the service corresponding to the second slice identifier;

a service group of the service corresponding to the first slice is the same as a service group of the service corresponding to the second slice;

the target base station supports the default slice;

the slice corresponding to the first slice identifier and the slice corresponding to the second slice identifier belong to a same slice group;

the first network side device supports the slice;

the first network side device supports the slice remapping;

the first network side device supports slice fallback; the number of slices that can be supported does not reach the maximum number of supported slices;

the number of remapped slices that can be supported does not reach the maximum number of supported remapped slices;

the number of fallback slices that can be supported does not reach the maximum number of supported fallback slices.

According to some embodiments, the apparatus further includes:

a first determination unit configured to, in response to that the first slice is the same as the second slice, determine one of the following behaviors: supporting the slice, determining to perform handover, the slice remapping, or the slice fallback.

According to some embodiments, the first slice being the same as the second slice includes: the first slice identifier of the first slice being the same as the second slice identifier of the second slice.

According to some embodiments, the apparatus further includes:

a second determination unit configured to determine that handover is not supported, or the slice is not supported, or the slice remapping is not supported, or the slice fallback is not supported, in response to that the first slice is different from the second slice and/or it is determined that at least one of the following slice information does not satisfy a condition:

the service corresponding to the first slice identifier, the service corresponding to the second slice identifier, the service corresponding to the first slice, the service corresponding to the second slice, the capability of the target base station for slice support, whether the target base station supports the default slice, the slice corresponding to the first slice identifier, and the slice corresponding to the second slice identifier.

According to some embodiments, the second determination unit determines that the slice information does not satisfy the condition in at least one of the following situations that:

the first network side device determines that the service corresponding to the first slice identifier is different from the service corresponding to the second slice identifier;

the first network side device determines that the target base station does not support the default slice;

the first network side device determines that the slice corresponding to the first slice identifier and the slice corresponding to the second slice identifier do not belong to a same slice group;

the first network side device determines that the service corresponding to the first slice is different from the service corresponding to the second slice;

the first network side device determines that a service group of the service corresponding to the first slice identifier is different from a service group of the service corresponding to the second slice identifier;

the first network side device determines that a service group of the service corresponding to the first slice is different from a service group of the service corresponding to the second slice;

the first network side device does not support the slice;

the first network side device does not supports the slice remapping;

the first network side device does not support the slice fallback;

the number of slices that can be supported has reached the maximum number of supported slices;

the number of remapped slices that can be supported has reached the maximum number of supported remapped slices; and the number of fallback slices that can be supported has reached the maximum number of supported fallback slices.

According to some embodiments, when the second determination unit determines that the slice is not supported, the apparatus further includes:

a first sending unit configured to, when it is determined that at least one of the slice, slice remapping and slice fallback is not supported, send at least one of the following information: a handover response message and a slice support result.

According to some embodiments, the apparatus further includes at least one of the following:

a third determination unit configured to determine to perform the slice remapping or slice fallback, wherein the handover response message includes at least one of: a slice remapping success or slice fallback success, a corresponding Packet Data Unit (PDU) session list, and an identifier/indication for the slice remapping or slice fallback;

a fourth determination unit configured to, when it is determined that the slice is supported, determine to perform the slice remapping or slice fallback, wherein the handover response message includes at least one of:

a slice remapping success or slice fallback success, a corresponding PDU session list, an identifier/indication for slice support, and an identifier/indication for the slice remapping or slice fallback;

a fifth determination unit configured to determine perform not to perform the slice remapping or slice fallback, wherein the handover response message includes at least one of: a cause for a failure of slice remapping or a failure of slice fallback or a non-supported slice, a corresponding PDU session list, and an identifier/indication for non-supported slice remapping or slice fallback;

a sixth determination unit configured to, when it is determined that the slice is not supported, determine perform not to perform the slice remapping or slice fallback, wherein the handover response message includes at least one of: a cause for a failure of slice remapping or a failure of slice fallback or a non-supported slice, a corresponding PDU session list, and an identifier/indication for non-supported slice remapping or slice fallback;

wherein the handover response message includes information about whether the slice remapping is supported, or information about whether the slice fallback is supported.

According to some embodiments, the apparatus further includes:

a second sending unit configured to, when it is determined that the slice is supported and it is determined to perform the slice remapping or slice fallback, send a notification message for notifying that the slice remapping or slice fallback is performed to a second network side device.

According to some embodiments, the first sending unit includes:

a sending module configured to send handover failure information to the source base station.

According to some embodiments, a third sending unit is configured to, when it is determined that the slice is not supported, send a notification message for notifying that the slice is not supported to the target base station, wherein upon receiving of the notification message for notifying that the slice is not supported, the target base station generates information that the slice is not supported, and the first network side device sends the information that the slice is not supported to the source base station.

According to some embodiments, the determination module further includes:

a second determination submodule configured to, in response to that the first slice is different from the second slice, determine to perform the slice remapping or slice fallback when it is determined that at least one of the following slice information satisfies a condition:

a Packet Data Unit (PDU) session that needs to be switched, and a slice that needs to be switched.

According to some embodiments, the first slice being different from the second slice includes:

a first slice identifier of the first slice being different from a second slice identifier of the second slice.

According to some embodiments, the second determination submodule is configured to determine that the slice information satisfies the condition and determine to perform at least one of handover, the slice remapping and the slice fallback in at least one of the following situations that:

the PDU session that needs to be switched has a requirement or indication for handover service continuity;

the slice to be switched has a requirement or indication for handover service continuity; t the PDU session that needs to be switched but is not supported by the target base station is a service that needs to be guaranteed as priority;

the slice that needs to be switched but is not supported by the target base station is a service that needs to be guaranteed as priority; the number of slices that the first network side device can support has reached a corresponding threshold, and the slice that needs to be switched corresponds to a service that needs to be guaranteed as priority;

the number of slices that can be supported by the first network side device has reached a corresponding threshold, and the PDU session that needs to be switched has a requirement or indication for handover service continuity;

the number of remapped slices that can be supported by the first network side device has reached a corresponding threshold, and the slice that needs to be switched corresponds to a service that needs to be guaranteed as priority;

the number of remapped slices that can be supported by the first network side device has reached a corresponding threshold, and the PDU session that needs to be switched has a requirement or indication for handover service continuity;

the number of fallback slices that can be supported by the first network side device has reached a corresponding threshold, and the slice that needs to be switched corresponds to a service that needs to be guaranteed as priority; and the number of fallback slices that can be supported by the first network side device has reached a corresponding threshold, and the PDU session that needs to be switched has a requirement or indication for handover service continuity.

According to some embodiments, the apparatus further includes:

a fourth sending unit configured to, when it is determined to perform the slice remapping or the slice fallback, send a handover success message.

According to some embodiments, when it is determined to perform the slice remapping, the handover success message includes slice remapping indication information or a corresponding PDU session list; when it is determined to perform the slice fallback, the handover success message includes slice fallback indication information or a corresponding PDU session list.

According to some embodiments, the apparatus further includes:

an execution unit configured to, in response to that the first slice is the same as the second slice, perform the handover or the slice remapping or the slice fallback.

According to some embodiments, the first slice being the same as the second slice, includes:

a first slice identifier of the first slice being the same as a second slice identifier of the second slice.

According to some embodiments, the apparatus further includes:

a seventh determination unit configured to determine that the slice remapping or the slice fallback is not supported in response to that the first slice is different from the second slice, and/or, it is determined that at least one of the following slice information does not satisfy a condition:

a PDU session that needs to be switched, and a slice that needs to be switched.

According to some embodiments, the seventh determination unit is configured to determine that the slice information does not satisfy the condition in at least one of the following situations that:

the PDU session that needs to be switched does not have a requirement or indication for handover service continuity;

the slice that needs to be switched does not have the requirement or indication for handover service continuity;

the PDU session that needs to be switched but is not supported by the target base station is not a service that needs to be guaranteed as priority;

the slice that needs to be switched but is not supported by the target base station is not a slice that needs to be guaranteed as priority.

According to some embodiments, the apparatus further includes:

a fifth sending unit configured to, when it is determined that the handover or the slice remapping or slice fallback is not supported, send at least one of:

a handover response message, a list of PDU sessions that do not support slice remapping, a list of PDU sessions that do not support slice fallback, and a cause for nonsupport.

According to some embodiments, the apparatus further include at least one of:

the handover response message including handover failure information, wherein the handover failure information includes a failure cause;

wherein the failure cause includes at least one of: a slice remapping failure, a slice fallback failure, and slice non-supported;

the handover response message including a handover request ACK for the first handover request, wherein the handover request ACK includes information indicating that the slice remapping or slice fallback is not supported.

According to some embodiments, the slice information includes at least one of:

information for indicating a slice support capability of a target base station;

a slice identifier supported by the source base station;

a slice identifier corresponding to a PDU session currently established by a terminal;

a slice identifier supported by the target base station;

a service corresponding to a slice or slice identifier;

a service group to which a service corresponding to the slice or slice identifier belongs;

a group to which the slice or slice identifier belongs;

an indication of whether a default slice of the target base station is supported;

an indication of whether the target base station supports or allows a slice identified by a default slice identifier;

whether a PDU session or slice that needs to be switched has a requirement or indication for handover service continuity;

whether a PDU session or slice that needs to be switched but is not supported by the target base station is a service or slice that needs to be guaranteed as priority;

a maximum number of supported slices;

a maximum number of supported remapped slices; and a maximum number of supported fallback slices.

According to some embodiments, the slice support capability includes at least one of: whether the slice is supported, whether the slice remapping is supported, and whether the slice fallback is supported.

According to some embodiments, the slice identifier includes at least one: Single Network Slice Selection Assistance Information (S-NSSAI), Network Slice Selection Assistance Information (NSSAI) or a NSSAI list, and a network slice identifier (NSID).

According to some embodiments, the apparatus further include at least one of:

a sixth sending unit configured to send a first context update request to a second network side device, wherein:

the first context update request includes at least one of: a remapped or fallbacked packet data unit session with a cause value for remapping or fallback, an indication that remapping or fallback is needed, a PDU session that needs to be remapped or fallbacked, and a cause value for the remapping or fallback;

a second obtaining unit configured to obtain a first context update response, wherein the first context update response is a response by the second network side device to the first context update request, and is used to indicate a result of performing slice remapping or fallback on the PDU session;

a seventh sending unit configured to send a second handover request to a target base station, wherein:

the second handover request includes at least one of: the remapped or fallbacked packet data unit session with the cause value for remapping or fallback, and an indication that remapping or fallback is needed;

a third obtaining unit configured to obtain a handover request response message, wherein the handover request response message is from the target base station, and includes at least one of:

the remapped or fallbacked packet data unit session with the cause value for remapping or fallback, a list of failed PDU sessions, failure causes corresponding to the failed PDU sessions, and a data forwarding tunnel corresponding to a PDU session that needs to be remapped or fallbacked;

an eighth sending unit configured to send a second context update request to the second network side device after the handover request response message is obtained, wherein the handover request response message is obtained by the target base station in response to the second handover request and is used to update session management information based on a result of the target base station;

a fourth obtaining unit configured to obtain a second context update response, and confirm an update result of session management;

a ninth sending unit configured to send a handover command to the source base station, wherein:

the handover command includes at least one of: the remapped or fallbacked packet data unit session with the cause value for remapping or fallback and the data forwarding tunnel corresponding to the PDU session that needs to be remapped or fallbacked;

a tenth sending unit configured to send the handover command to a terminal via the source base station, wherein the handover command includes the remapped or fallbacked packet data unit session with the cause value for remapping or fallback.

According to some embodiments, a data packet of the PDU session is forwarded by the source base station to the target base station through the data forwarding tunnel.

According to some embodiments, the second network side device is further configured to determine whether to perform the slice remapping, or to determine whether to perform the slice fallback, or to modify a result of the slice remapping determined by the first network side device, or to modify a result of the slice fallback determined by the first network side device, and the first network side device obtains the result of the slice remapping or slice fallback modified by the second network side device.

According to some embodiments, in a situation where there are one or at least two slice determination entities, the second network side device triggers Packet Data Unit (PDU) session modification/establishment procedure, and adds a remapped PDU session;

in response to that the second network side device triggers the PDU session establishment procedure, the second network side device notifies an application server, wherein the application server notifies an application layer of the terminal, and the application layer of the terminal notifies a non-access stratum (UE NAS) of the terminal to establish a corresponding PDU session; and in response to that the second network side device triggers the PDU session modification procedure, the second network side device updates a network slice identifier corresponding to the PDU session to at least one of the terminal, the first network side device and a base station.

According to some embodiments, the first network side device includes at least one of:

an Access and Mobility management Function (AMF), a Session Management Function (SMF), a 5G base station (gNB), and a next-generation eNB.

According to some embodiments, in response to that a target PDU session for remapping or fallback is a PDU session not currently established by a terminal, a new PDU session is required to be established to correspond to a user plane bearer DRB for an original PDU session; and/or in response to that the target PDU session for remapping or fallback is a PDU session currently established by the terminal, the original PDU session and/or DRB are deleted; and/or data of the DRB for the original PDU session which is to be remapped or fallbacked is forwarded to a path of the target PDU session for remapping or fallback so as to be transmitted to a User Plane Function (UPF).

According to some embodiments, the apparatus further includes:

a feedback unit configured to feed back a handover response message based on the slice information, wherein the handover response message carries information indicating that slice remapping or fallback is not supported, or information indicating that the slice remapping or fallback is supported.

According to some embodiments, the handover response message includes at least one of: handover failure information, a handover command, and a handover request ACK for the first handover request.

According to some embodiments, a threshold corresponding to at least one of a maximum number of supported slices, a maximum number of supported remapped slices and a maximum number of supported fallback slices in the slice information is predefined, or is determined according to a network capability, or is configured based on Operation Administration and Maintenance (OAM).

According to some embodiments, at least one of the maximum number of supported slices, the maximum number of supported remapped slices and the maximum number of supported fallback slices is a quantity supported by a network device as a whole, or a quantity supported by each terminal perUE.

According to some embodiments, when at least one of the maximum number of supported slices, the maximum number of supported remapped slices and the maximum number of supported fallback slices is the quantity supported perUE or is the quantity supported by the network device as a whole:

the apparatus is further configured to, in response to that a terminal has a first number of slices to be switched and a target base station supports handover of a second number of slices, determine via the target base station that handover of the second number of slices among the first number of slices is supported, and determine to perform slice fallback or slice remapping on slices among the first number of slices other than the second number of slices, or determine via the target base station that handover is not supported.

According to some embodiments, when at least one of the maximum number of supported slices, the maximum number of supported remapped slices and the maximum number of supported fallback slices is the quantity supported perUE or is the quantity supported by the network device as a whole:

the apparatus is further configured to, in response to that a target base station cannot accept all slices, according to priorities of slices that needs to be switched, determine via the target base station slices to be preferentially accepted or fallbacked or remapped.

According to some embodiments, when at least one of the maximum number of supported slices, the maximum number of supported remapped slices and the maximum number of supported fallback slices is the quantity supported perUE or is the quantity supported by the network device as a whole:

the apparatus is further configured to, in response to that the target base station cannot accept all slices, determine that the target base station does not support handover.

It should be noted that the above modules can be implemented by software or hardware, and the latter can be implemented in the following ways, but not limited to: the above modules are all located in the same processor; or, the above modules can be combined in any combination and may be located in different processors.

Figure 5:
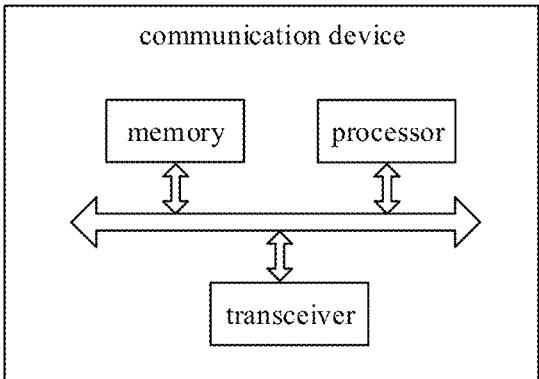
FIG. 5 is a schematic structural diagram of a communication device according to an embodiment of the present disclosure.

FIG. 5 is a schematic structural diagram of a communication device according to an embodiment of the present disclosure. The communication device shown in FIG. 5 includes a processor, and the processor may call and run a computer program from a memory to perform the method in embodiments of the present disclosure.

According to embodiments, as shown in FIG. 5, the communication device may further include a memory. The processor may call and run a computer program from the memory to perform the method in embodiments of the present disclosure.

The memory may be a separate device independent of the processor, or may be integrated in the processor.

According to embodiments, as shown in FIG. 5, the communication device may further include a transceiver, and the processor may control the transceiver to communicate with other devices. Specifically, the transceiver may send information or data to other devices, or receive information or data sent by other devices.

The transceiver may include a transmitter and a receiver. The transceiver may further include one or more antennas.

According to embodiments, the communication device may specifically be the network device according to an embodiment of the present disclosure, and the communication device may implement the corresponding processes implemented by the network device in the method embodiments of the present disclosure.

According to embodiments, the communication device may specifically be the mobile terminal/terminal device in embodiments of the present disclosure, and the communication device may implement the corresponding processes implemented by the mobile terminal/terminal device in the method embodiments of the present disclosure. For brevity, details are not repeated here.

Figure 6:
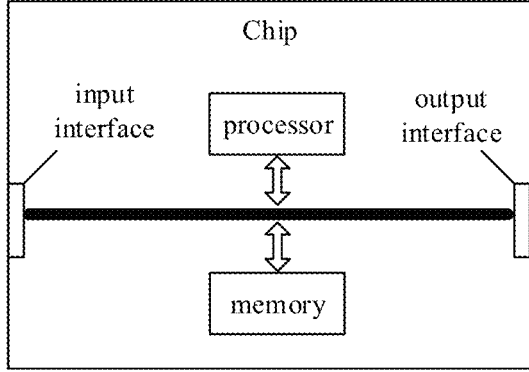
FIG. 6 is a schematic diagram of a chip structure according to an embodiment of the present disclosure.

FIG. 6 is a schematic structural diagram of a chip according to an embodiment of the present disclosure. The chip shown in FIG. 6 includes a processor and the processor can call and run a computer program from a memory to implement the method according to embodiments of the present disclosure.

According to embodiments, as shown in FIG. 6, the chip may further include a memory. The processor may call and run a computer program from the memory to implement the method according to embodiments of the present disclosure.

The memory may be a separate device independent of the processor, or may be integrated in the processor.

According to embodiments, the chip may further include an input interface. The processor may control the input interface to communicate with other devices or chips, and specifically, the processor can control the input interface to obtain information or data sent by other devices or chips.

According to embodiments, the chip may further include an output interface. The processor can control the output interface to communicate with other devices or chips, and specifically, the processor can control the output interface to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the device can be applied to the mobile terminal/terminal device in embodiments of the present disclosure, and the chip can implement the corresponding processes implemented by the mobile terminal/terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

Figure 7:
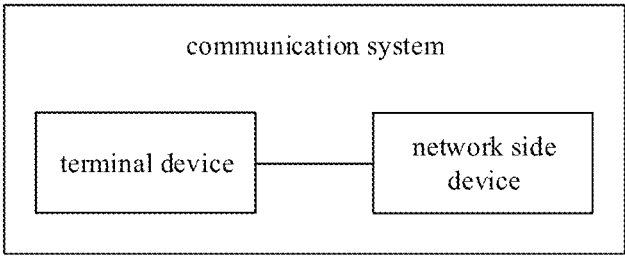
FIG. 7 is a structural block diagram of a communication system according to an embodiment of the present disclosure.

FIG. 7 is a structural block diagram of a communication system according to an embodiment of the present disclosure. As shown in FIG. 7, the communication system includes a terminal device and a network device. The terminal device can be used to implement the corresponding functions implemented by the terminal device in the above method embodiments, and the network device can be used to implement the corresponding functions implemented by the network device in the above method embodiments. For brevity, details are not repeated here.

It should be understood that the processor in embodiments of the present disclosure may be an integrated circuit chip with signal processing capability. In implementations, the steps of the foregoing method embodiments can be completed by hardware integrated logic circuits in the processor or instructions in the form of software. The above-mentioned processor may be a general-purpose processor, a Digital Signal Processor (DSP), an Application Specific Integrated Circuit (ASIC), a Field Programmable Gate Array (FPGA) or other programmable logic device, discrete gate or transistor logic device, discrete hardware component. The methods, steps, and logical block diagrams disclosed in the embodiments of the present disclosure can be implemented or executed. The general-purpose processor may be a microprocessor or the processor may also be any conventional processor or the like. The steps of the methods disclosed in the embodiments of the present disclosure may be directly embodied as being executed and completed by a hardware decoding processor, or executed by a combination of hardware and software modules in the decoding processor. The software module can be located in a storage medium in the field, such as random access memory, flash memory, read-only memory, programmable read-only memory, or electrically erasable programmable memory, register. The storage medium is located in the memory, and the processor reads the information in the memory to perform the steps of the above methods in combination with hardware.

It can be understood that the memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EE-PROM) or flash memory. The volatile memory may be a Random Access Memory (RAM), which is used as an external cache. By way of exemplary rather than limitation, many forms of RAM are available, such as Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SL-DRAM)), or Direct Rambus RAM (DR RAM). It should be noted that the memory in the systems and methods described in the present disclosure is intended to include but not limited to these and any other suitable types of memory.

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

An embodiment of the present disclosure also provides a computer-readable storage medium for storing computer programs.

According to embodiments, the computer-readable storage medium may be applied to the network device in embodiments of the present disclosure, and the computer programs cause a computer to perform the corresponding processes implemented by the network device in each method embodiment of the present disclosure. For brevity, repeated descriptions are omitted here.

According to embodiments, the computer-readable storage medium may be applied to the mobile terminal/terminal device in embodiments of the present disclosure, and the computer programs cause a computer to perform the corresponding processes implemented by the mobile terminal/terminal device in each method embodiment of the present disclosure. For brevity, repeated descriptions are omitted here.

An embodiment of the present disclosure provides a computer program product, including computer program instructions.

According to embodiments, the computer program product may be applied to the network device in embodiments of the present disclosure, and the computer program instructions cause a computer to perform the corresponding processes implemented by the network device in each method embodiment of the present disclosure. For brevity, repeated descriptions are omitted here.

According to embodiments, the computer program product may be applied to the mobile terminal/terminal device in embodiments of the present disclosure, and the computer program instructions cause a computer to perform the corresponding processes implemented by the mobile terminal/terminal device in each method embodiment of the present disclosure. For brevity, repeated descriptions are omitted here.

An embodiment of the present disclosure also provides a computer program.

According to embodiments, the computer program may be applied to the network device in embodiments of the present disclosure, and when the computer program runs on a computer, the computer is caused to perform the corresponding processes implemented by the network device in each method embodiment of the present disclosure. For brevity, repeated descriptions are omitted here.

According to embodiments, the computer program may be applied to the mobile terminal/terminal device in embodiments of the present disclosure, and when the computer program runs on a computer, the computer is caused to perform the corresponding processes implemented by the mobile terminal/terminal device in each method embodiment of the present disclosure. For brevity, repeated descriptions are omitted here.

Those of ordinary skill in the art will appreciate that the exemplary units and algorithm steps described according to embodiments disclosed herein can be carried out by electronic hardware or a combination of electronic hardware and computer software. Whether the functions are implemented by hardware or software depends on particular applications and design constraints of the technical solutions. For each of the particular applications, a person skilled in the art can use different methods to implement the described functions, but such implementation should not be considered as beyond the scope of the present disclosure.

It may be clearly understood by those skilled in the art that details of specific operation procedures of the systems, devices and units can be found in the previous description regarding the method embodiments.

In the embodiments provided in the present disclosure, it should be understood that the disclosed systems, devices and methods may be implemented in other ways. For example, the device embodiments described above are merely illustrative. For example, the division of the units is only a kind of logical function division. In practice, other division manner may be used. For example, multiple units or components may be combined or integrated into another system, or some features may be ignored or not performed. In addition, the illustrated or discussed mutual coupling or direct coupling or communication connection may be indirect coupling or communication connection through some interfaces, devices or units, and may be in electrical, mechanical or other forms.

The units described as separated parts may or may not be physically separated, and the parts displayed as units may or may not be physical units, that is, the units may be located in one place, or may be distributed over multiple network units. Some or all of the units may be selected according to actual needs to achieve the objectives of the solutions in the embodiments.

In addition, the functional units in the embodiments of the present disclosure may be integrated in one processing unit, or the units may exist alone physically, or two or more units may be integrated in one unit.

The functions may also be stored in a computer-readable storage medium if being implemented in the form of a software functional unit and sold or used as an independent product. Based on such understanding, the essence of the technical solutions of the present disclosure, or the part contributing to the prior art or part of the technical solutions, may be embodied in the form of a software product. The computer software product is stored in a storage medium including a number of instructions such that a computer device (which may be a personal computer, a server, or a network device, etc.) performs all or part of steps of the method described in each of the embodiments of the present disclosure. The foregoing storage medium includes: any medium that is capable of storing program codes such as a USB disk, a mobile hard disk, a Read-Only Memory (ROM), a Random Access Memory (RAM), a magnetic disk or an optical disk, and the like.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. A slice processing method, comprising:

obtaining, by a network side device, a handover request sent from a source base station associated with a packet-data-unit (PDU) session to be handed over to a target base station, wherein the PDU session is associated with a second slice and the target base station is associated with at least a first slice, and wherein the handover request carries slice information and a Quality of Service (QoS) attribute set for at least one QoS flow of the PDU session;

identifying, by the network side device, that the first slice is different from the second slice by determining that a first slice identifier of the first slice is different from a second slice identifier of the second slice;

selecting, by the network device and based on the slice information and the QoS attribute set, a handover behavior, wherein the selecting the handover behavior comprises selecting one of:

remapping the second slice onto a different slice that is in a same slice-group as the first slice supported by the target base station, falling-back to a default slice supported by the target base station, and determining that the requested handover is not supported; and performing the selected handover behavior.

2. The method according to claim 1, further comprising:

feeding-back a handover request acknowledgment (ACK) message to the source base station; or feeding-back a handover command message to the source base station.

3. The method according to claim 2, wherein the handover request ACK message or the handover command message is further used to indicate whether the remapping the second slice or the falling-back to the default slice is supported or not supported.

4. The method according to claim 1, wherein the selecting the handover behavior is based on the slice information and based on one or more handover behavior rules configured by an operation-administration-maintenance (OAM) entity and stored at the network side device.

5. The method according to claim 1, wherein the handover request is determined to not be supported based on a maximum number of slices supported by the target base station.

6. The method according to claim 1, further comprising:
determining whether the PDU session is marked for service continuity or priority; and
prioritizing the PDU session for the selecting the handover behavior based on the determining.

7. The method according to claim 1, wherein the falling-back to the default slice is selected on a condition that the second slice cannot be remapped onto a different slice that is in the same slice-group as the first slice.

8. The method according to claim 1, further comprising transmitting a handover response message that indicates the selected handover behavior.

9. The method according to claim 8, wherein the selecting the handover behavior is further based on whether a user equipment reaches a configured maximum slice number.

10. The method according to claim 1, wherein the selecting is before the target base station finalizes admission of handover.

11. A network side device comprising:
one or more processors, and memory storing operational instructions that, when executed by at least one of the one or more processors, cause the network side device to:
obtain a handover request sent from a source base station associated with a packet-data-unit (PDU) session to be handed over to a target base station, wherein the PDU session is associated with a second slice and the target base station is associated with at least a first slice, and wherein the handover request carries slice information and a Quality of Service (QoS) attribute set for at least one QoS flow of the PDU session;
identify that the first slice is different from the second slice by determining that a first slice identifier of the first slice is different from a second slice identifier of the second slice;
select, based on the slice information and the QoS attribute set, a handover behavior, wherein the selection of the handover behavior comprises selection of one of:
remapping the second slice onto a different slice that is in a same slice-group as the first slice supported by the target base station,
falling-back to a default slice supported by the target base station, and determining that the requested handover is not supported; and
perform the selected handover behavior.

12. The network side device according to claim 11, wherein the operational instructions, when executed by at least one of the one or more processors, further causes the network side device to:
feed-back a handover request acknowledgment (ACK) message to the source base station; or
feed-back a handover command message to the source base station.

13. The network side device according to claim 12, wherein the handover request ACK message or the handover command message is further used to indicate whether the remapping the second slice or the falling-back to the default slice is supported or not supported.

14. The network side device according to claim 11, wherein the handover behavior is selected based on the slice information and based on one or more handover behavior rules configured by an operation-administration-maintenance (OAM) entity and stored at the network side device.

15. The network side device according to claim 11, wherein
the handover request is determined to not be supported based on a maximum number of slices supported by the target base station.

16. The network side device according to claim 11, wherein the operational instructions, when executed by at least one of the one or more processors, further causes the network side device to:
determine whether the PDU session is marked for service continuity or priority; and
prioritize the PDU session for the selection of the handover behavior based on the determination.

17. The network side device according to claim 11, wherein the operational instructions, when executed by at least one of the one or more processors, further causes the network side device to:
select the falling-back to the default slice on a condition that the second slice cannot be remapped onto a different slice that is in the same slice-group as the first slice.

18. The network side device according to claim 11, wherein the operational instructions, when executed by at least one of the one or more processors, further causes the network side device to:
transmit a handover response message that indicates the selected handover behavior.

19. The network side device according to claim 18, wherein the selected handover behavior is further based on whether a user equipment reaches a configured maximum slice number.

20. The network side device according to claim 11, wherein
the handover behavior is selected before the target base station finalizes admission of handover.

* * * * *